(12) United States Patent
Nakamura et al.

(10) Patent No.: US 9,678,318 B2
(45) Date of Patent: Jun. 13, 2017

(54) ZOOM LENS AND IMAGE PICKUP APPARATUS INCLUDING THE SAME

(71) Applicant: CANON KABUSHIKI KAISHA, Tokyo (JP)

(72) Inventors: Tomoyuki Nakamura, Utsunomiya (JP); Kazuya Shimomura, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/535,778

(22) Filed: Nov. 7, 2014

(65) Prior Publication Data

US 2015/0131165 A1 May 14, 2015

(30) Foreign Application Priority Data

Nov. 12, 2013 (JP) ................................. 2013-234394

(51) Int. Cl.
*G02B 15/173* (2006.01)
*G02B 15/167* (2006.01)

(52) U.S. Cl.
CPC ......... *G02B 15/173* (2013.01); *G02B 15/167* (2013.01)

(58) Field of Classification Search
CPC ...... G02B 13/009; G02B 15/00; G02B 15/14; G02B 15/163; G02B 15/167; G02B 15/20; G02B 15/22; G02B 15/24; G02B 15/173

USPC ................ 359/683, 684, 685, 686, 687, 688
See application file for complete search history.

(56) References Cited

U.S. PATENT DOCUMENTS 7,982,971 B2 * 7/2011 Nakamura ........... G02B 15/177
359/688
2013/0003189 A1 * 1/2013 Sanjo .................... G02B 7/008
359/686

FOREIGN PATENT DOCUMENTS

JP       H09-15501 A       1/1997
JP       2004-341237 A     12/2004

* cited by examiner

*Primary Examiner* — Darryl J Collins
*Assistant Examiner* — Journey Sumlar
(74) *Attorney, Agent, or Firm* — Carter, DeLuca, Farrell & Schmidt, LLP

(57) ABSTRACT

Provided is a zoom lens, including, in order from an object side to an image side: a positive first lens unit that does not move for zooming; a negative second lens unit that moves during zooming; and a positive N-th lens unit that does not move for zooming and is arranged closest to the image side. Among lenses constructing the second lens unit, two lenses closest to the image side are a positive lens and a negative lens, and partial dispersion ratios for g-line and F-line and Abbe numbers for a d-line of the positive and negative lenses, and an average value of refractive indices of all the lenses of the second lens unit are appropriately set.

18 Claims, 16 Drawing Sheets

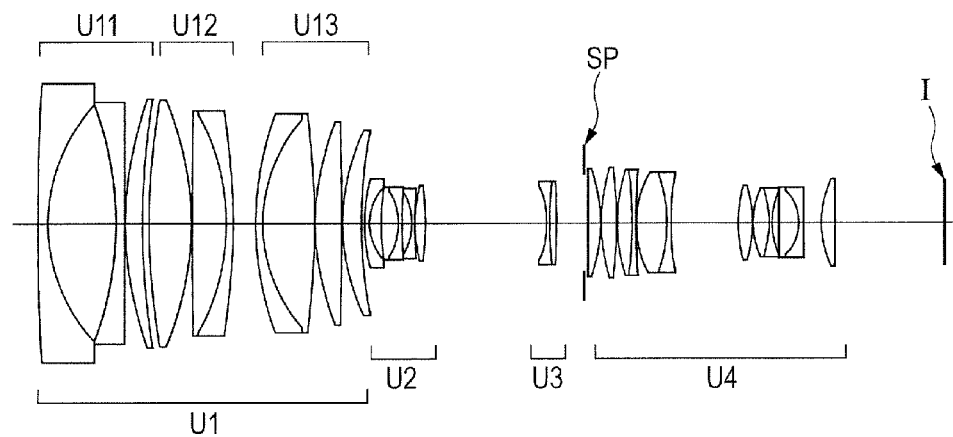
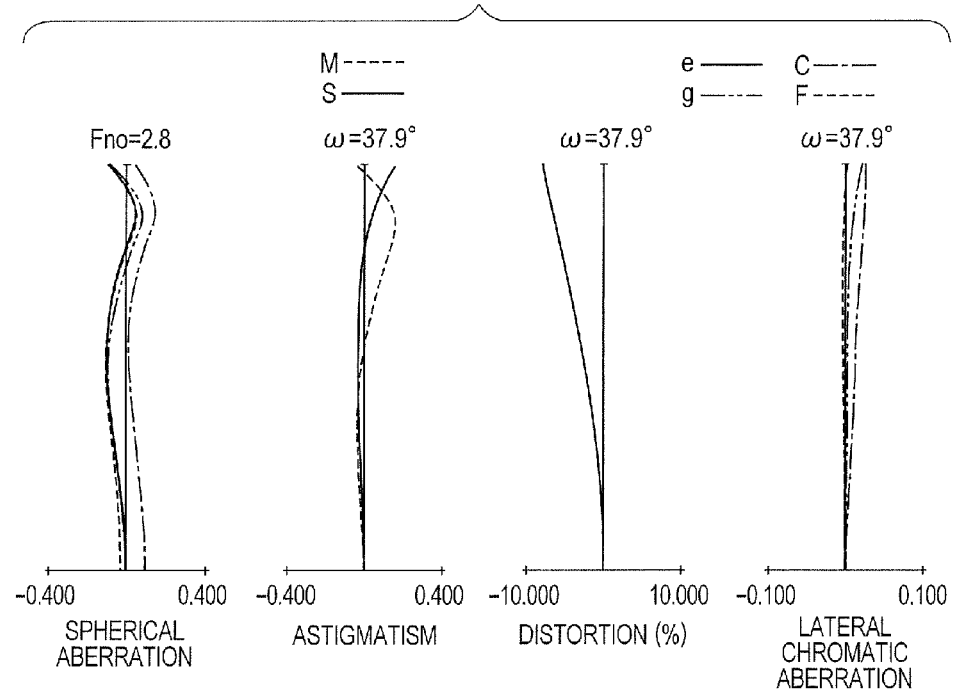

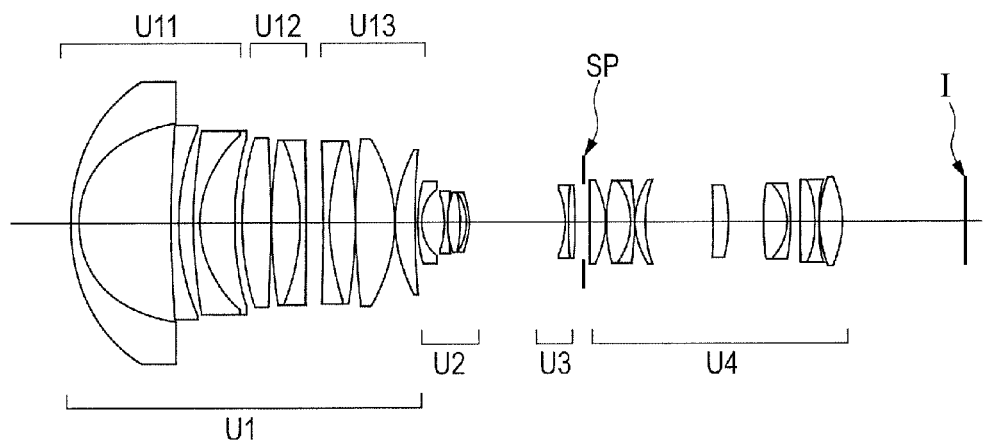
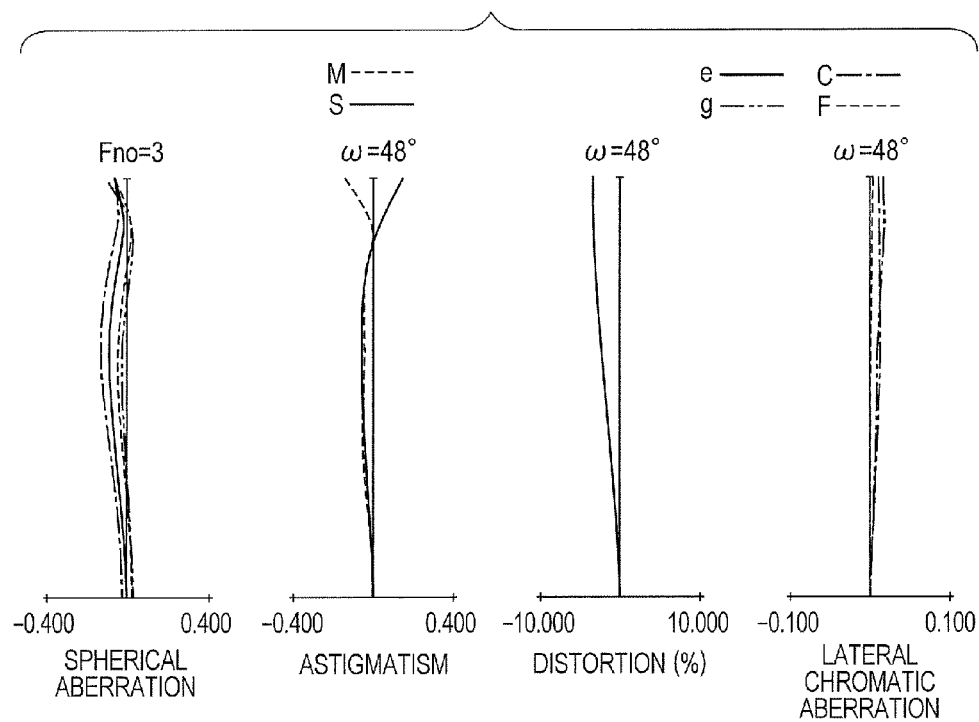

ZOOM LENS AND IMAGE PICKUP APPARATUS INCLUDING THE SAME

BACKGROUND OF THE INVENTION

Field of the Invention

The present invention relates to a zoom lens and an image pickup apparatus including the same, which are suitable for a broadcasting television camera, a movie camera, a video camera, a digital still camera, a monitoring camera, and a silver-halide film camera, for example.

Description of the Related Art

In recent years, a zoom lens having a wide angle of field, a high zoom ratio, and high optical performance is required for an image pickup apparatus such as a television camera, a movie camera, a silver-halide film camera, a digital camera, or a video camera. There has been known, as a zoom lens having a wide angle of field and a high zoom ratio, a four-unit zoom lens including a first lens unit having a positive refractive power, a second lens unit having a negative refractive power that is used for zooming, a third lens unit having a negative refractive power that is used to correct image plane variation accompanying zooming, and a fourth lens unit having a positive refractive power that is used for image formation (Japanese Patent Application Laid-Open No. H09-15501 and Japanese Patent Application Laid-Open No. 2004-341237).

In Japanese Patent Application Laid-Open No. H09-15501, there is disclosed a zoom lens having a zoom ratio of approximately 8 and an angle of field of photography at a wide angle end of approximately 87°. In Japanese Patent Application Laid-Open No. 2004-341237, there is disclosed a zoom lens having a zoom ratio of approximately 2.9 and an angle of field of photography at a wide angle end of approximately 94°.

In the four-unit zoom lens having the structure described above, it is relatively easy to achieve the increased angle of field. However, in order to obtain high optical performance in the four-unit zoom lens, it is important to satisfactorily correct a lateral chromatic aberration in the entire zoom range. If an optical material having characteristics of anomalous dispersion is used, the lateral chromatic aberration is satisfactorily corrected with ease. However, even if a lens made of the material having the characteristics of anomalous dispersion is merely used, it is difficult to satisfactorily correct the chromatic aberration. In order to obtain the high optical performance over the entire zoom range in the above-mentioned four-unit zoom lens, it is important to appropriately set the materials of the lenses included in the second lens unit that moves during the zooming.

In addition, in the four-unit zoom lens having the structure described above, the high zoom ratio is relatively easy to achieve, but in order to achieve both the increased high zoom ratio and the reduction in size, it is important to appropriately set the arrangement of the refractive powers of the lenses. In particular, in the four-unit zoom lens having the structure described above, the second lens unit mainly plays a role of changing the zoom. Therefore, it is important to satisfactorily set the lens structure of the second lens unit and the materials of the lenses included in the second lens unit.

SUMMARY OF THE INVENTION

It is an object of the present invention to provide a zoom lens having a wide angle of field, a high zoom ratio, high optical performance over an entire zoom range, and good zoom action, and to provide an image pickup apparatus including the zoom lens.

According to one embodiment of the present invention, there is provided a zoom lens, including, in order from an object side to an image side: a first lens unit having a positive refractive power that does not move for zooming; a second lens unit having a negative refractive power that moves during zooming; a third lens unit that moves during zooming; and an N-th lens unit having a positive refractive power that does not move for zooming, the N-th lens unit being arranged closest to the image side, in which, among lenses constructing the second lens unit or among lenses constructing the second lens unit and the third lens unit, two lenses disposed closest to the image side comprise a positive lens and a negative lens, and satisfy the following conditional expressions:

$$-3.0 \times 10^{-3} < (\theta p - \theta n)/(\nu p - \nu n) < 0; \text{ and}$$

$$1.7 < nave < 2.0,$$

where $\theta p$ and $\nu p$ represent a partial dispersion ratio and an Abbe number of the positive lens, respectively, $\theta n$ and $\nu n$ represent a partial dispersion ratio and an Abbe number of the negative lens, respectively, and nave represents an average value of refractive indices of all the lenses of the second lens unit, provided that the Abbe number $\nu$ and the partial dispersion ratio $\theta$ are respectively expressed as follows:

$$\nu = (nd-1)/(nF-nC); \text{ and}$$

$$\theta = (ng-nF)/(nF-nC),$$

where ng represents a refractive index for a g-line, nF represents a refractive index for an F-line, nd represents a refractive index for a d-line, and nC represents a refractive index for a C-line.

According to one embodiment of the present invention, it is possible to provide the zoom lens having a wide angle of field, a high zoom ratio, and high optical performance over the entire zoom range, and to provide the image pickup apparatus including the zoom lens.

Further features of the present invention will become apparent from the following description of exemplary embodiments with reference to the attached drawings.

BRIEF DESCRIPTION OF THE DRAWINGS

FIG. 5 is a lens cross-sectional view when focusing on an infinite object at a wide angle end of a zoom lens according to Numerical Embodiment 3 of the present invention.

FIG. 6A is an aberration diagram when focusing on the infinite object at the wide angle end of the zoom lens according to Numerical Embodiment 3 of the present invention.

FIG. 9 is a lens cross-sectional view when focusing on an infinite object at a wide angle end of a zoom lens according to Numerical Embodiment 5 of the present invention.

FIG. 10A is an aberration diagram when focusing on the infinite object at the wide angle end of the zoom lens according to Numerical Embodiment 5 of the present invention.

DESCRIPTION OF THE EMBODIMENT

Now, an embodiment of the present invention is described in detail with reference to the attached drawings. A zoom lens according to each of Embodiments 1 to 6 of the present invention includes, in order from an object side to an image side: a first lens unit having a positive refractive power that does not move for zooming; a second lens unit having a negative refractive power that moves during zooming; a third lens unit having a negative refractive power that moves during zooming; and a fourth lens unit having a positive refractive power that does not move for zooming.

A zoom lens according to Embodiment 7 of the present invention includes, in order from an object side to an image side: a first lens unit having a positive refractive power that does not move for zooming; a second lens unit having a negative refractive power that moves during zooming; a third lens unit having a negative refractive power that moves during zooming; a fourth lens unit having a negative refractive power that moves during zooming; and a fifth lens unit having a positive refractive power that does not move for zooming.

The expression that "a lens unit does not move for zooming" means herein that the lens unit is not driven for a purpose of zooming, but the lens unit may move for focusing if zooming and focusing are performed simultaneously.

Figure 1:
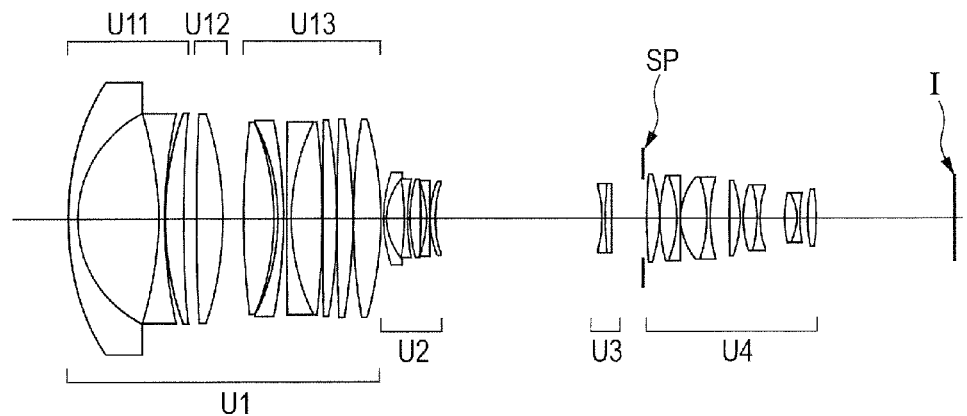
FIG. 1 is a lens cross-sectional view when focusing on an infinite object at a wide angle end of a zoom lens according to Numerical Embodiment 1 of the present invention.
Figure 2A:
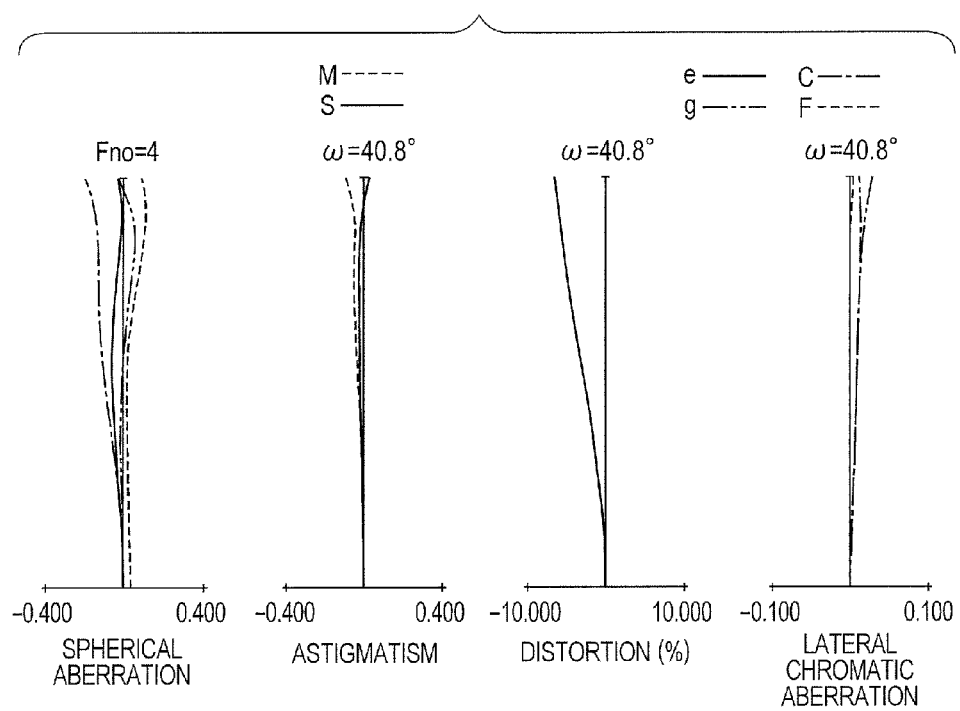
FIG. 2A is an aberration diagram when focusing on the infinite object at the wide angle end of the zoom lens according to Numerical Embodiment 1 of the present invention.
Figure 2B:
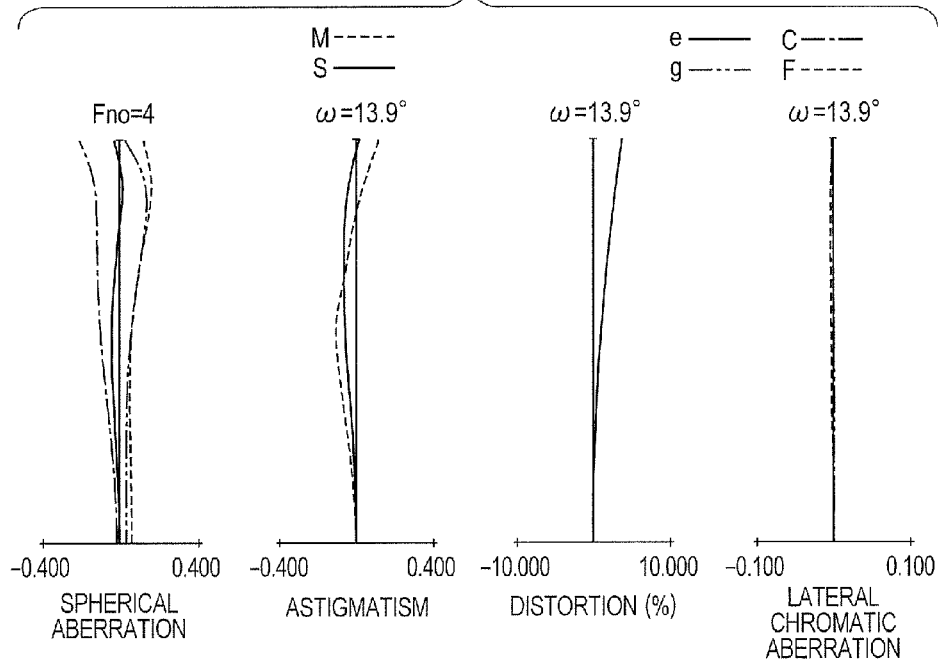
FIG. 2B is an aberration diagram when focusing on the infinite object at an intermediate zoom position of the zoom lens according to Numerical Embodiment 1 of the present invention.
Figure 2C:
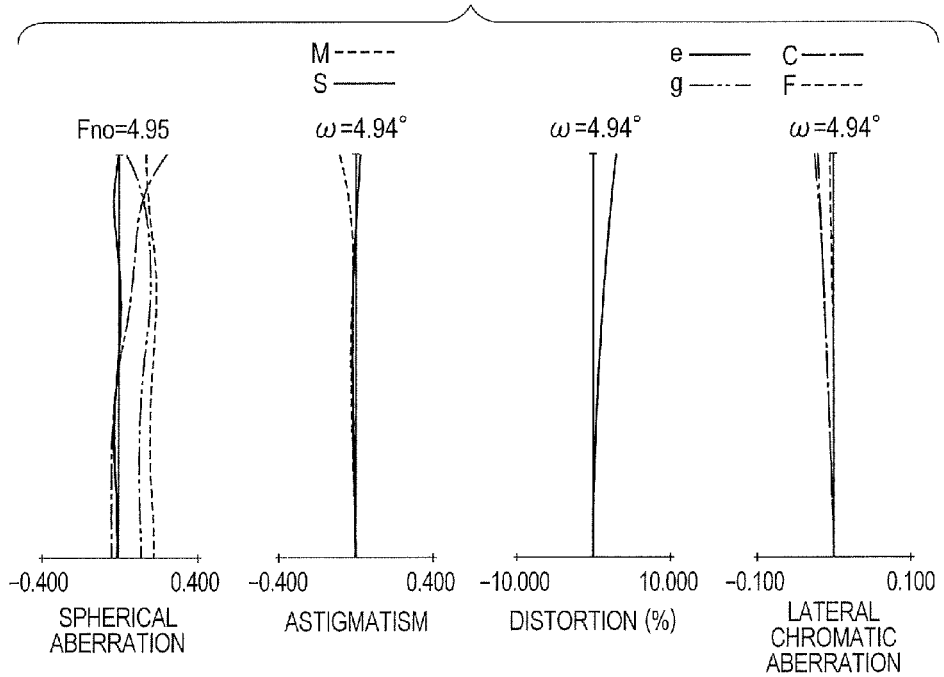
FIG. 2C is an aberration diagram when focusing on the infinite object at a telephoto end of the zoom lens according to Numerical Embodiment 1 of the present invention.

FIG. 1 is a lens cross-sectional view of a zoom lens according to Embodiment 1 (Numerical Embodiment 1) of the present invention when focusing on an infinite object at a wide angle end (focal length f=18.00 mm). FIGS. 2A, 2B, and 2C are aberration diagrams respectively at the wide angle end, at an intermediate zoom position (focal length f=63.00 mm), and at a telephoto end (focal length f=180.00 mm) of the zoom lens according to Numerical Embodiment 1 when focusing on an infinite object. Here, the focal length is a value of this numerical embodiment expressed in millimeters. The same is true for the following embodiments.

Figure 3:
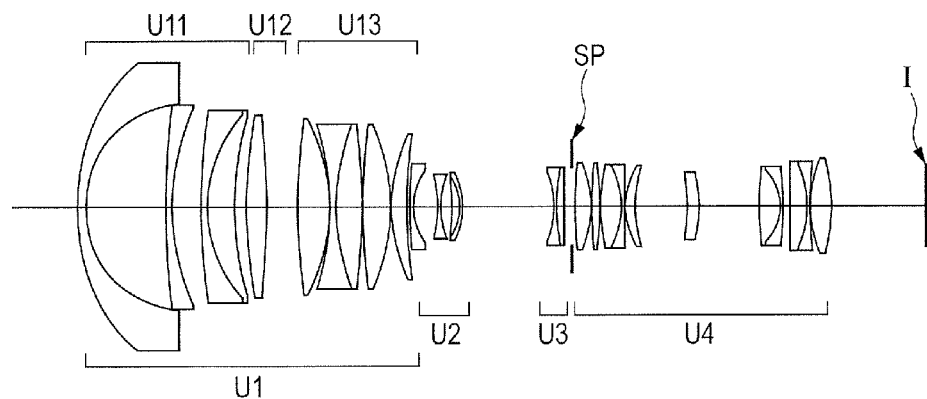
FIG. 3 is a lens cross-sectional view when focusing on an infinite object at a wide angle end of a zoom lens according to Numerical Embodiment 2 of the present invention.
Figure 4A:
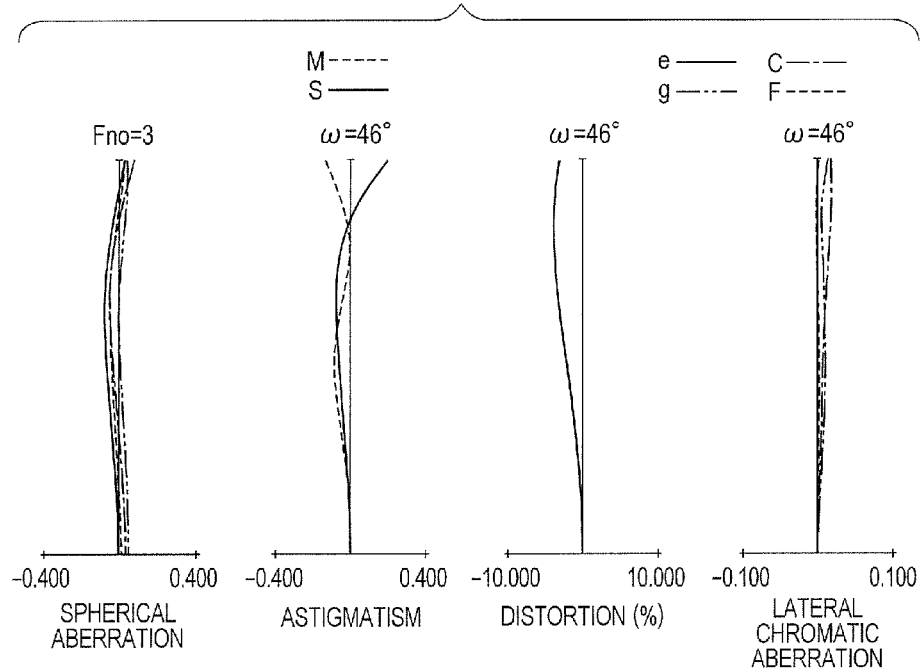
FIG. 4A is an aberration diagram when focusing on the infinite object at the wide angle end of the zoom lens according to Numerical Embodiment 2 of the present invention.
Figure 4B:
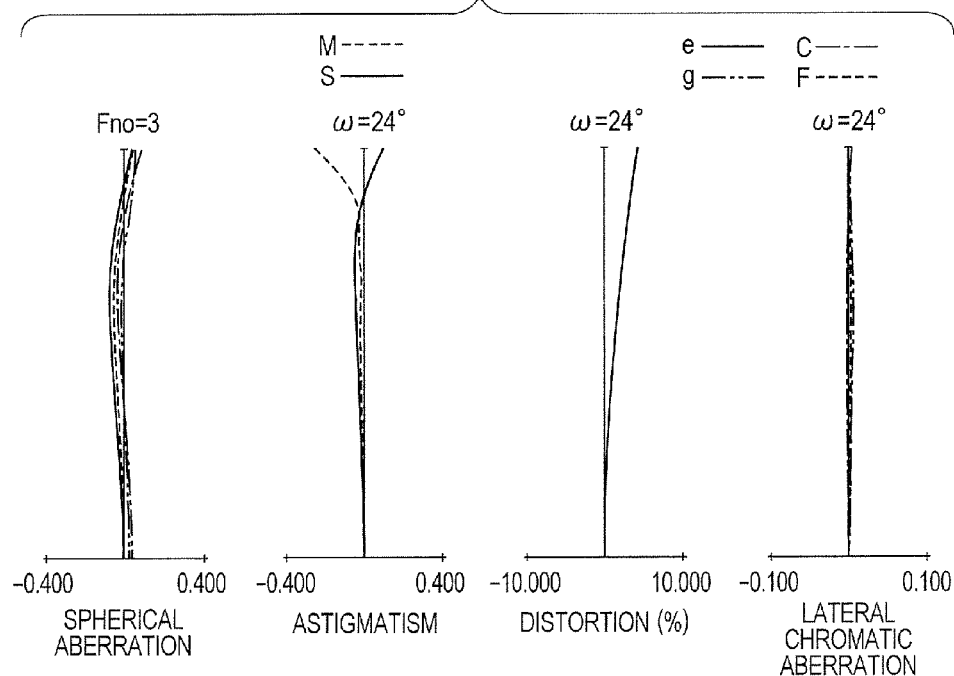
FIG. 4B is an aberration diagram when focusing on the infinite object at an intermediate zoom position of the zoom lens according to Numerical Embodiment 2 of the present invention.
Figure 4C:
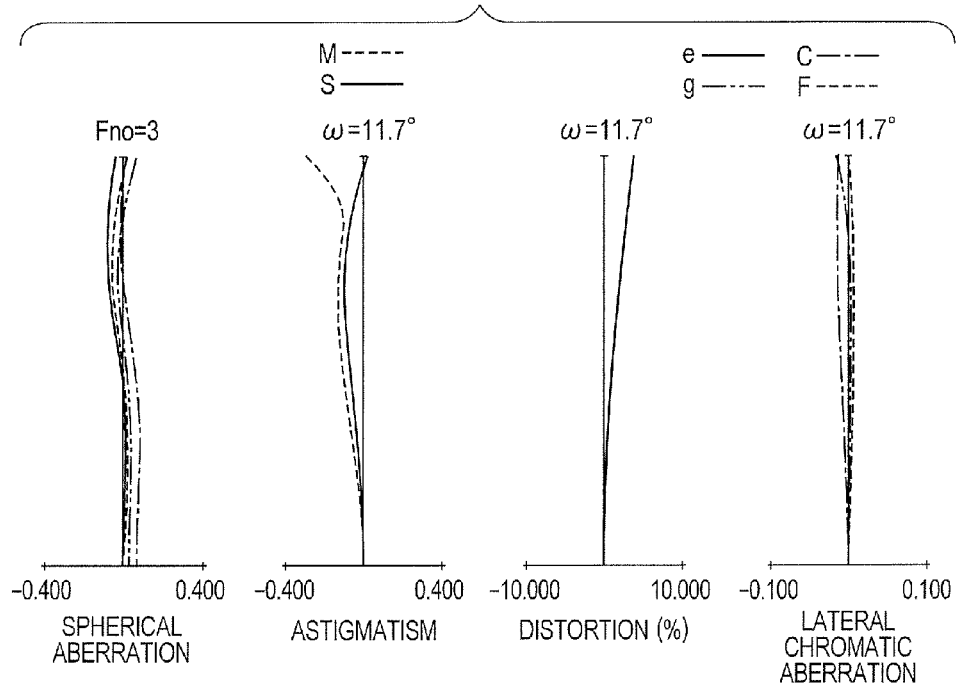
FIG. 4C is an aberration diagram when focusing on the infinite object at a telephoto end of the zoom lens according to Numerical Embodiment 2 of the present invention.

FIG. 3 is a lens cross-sectional view of a zoom lens according to Embodiment 2 (Numerical Embodiment 2) of the present invention at a wide angle end (focal length f=15.00 mm) when focusing on an infinite object. FIGS. 4A, 4B, and 4C are aberration diagrams respectively at the wide angle end, at an intermediate zoom position (focal length f=35.00 mm), and at a telephoto end (focal length f=75.00 mm) of the zoom lens according to Numerical Embodiment 2 when focusing on an infinite object.

Figure 6B:
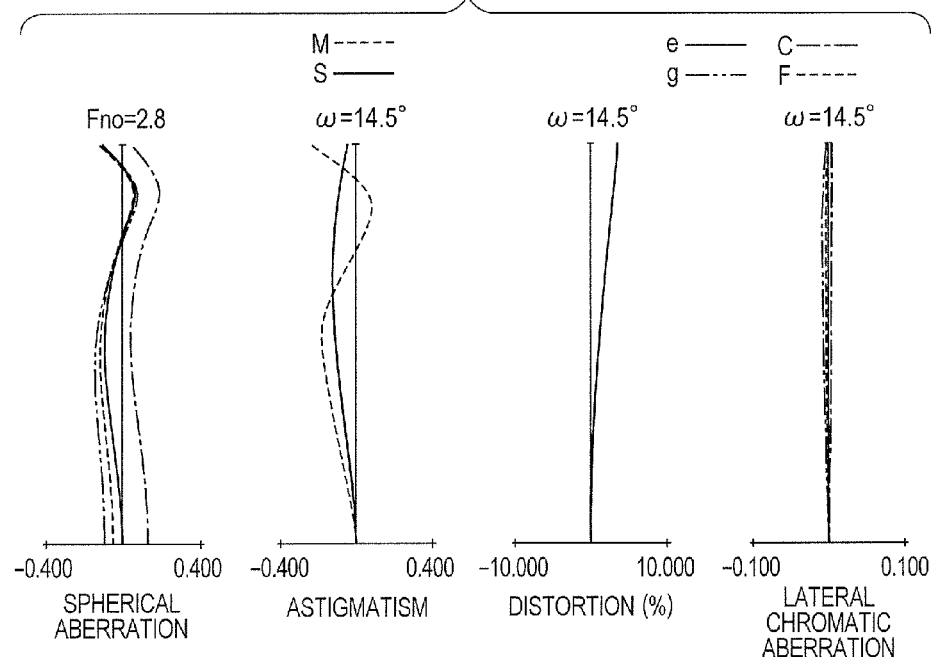
FIG. 6B is an aberration diagram when focusing on the infinite object at an intermediate zoom position of the zoom lens according to Numerical Embodiment 3 of the present invention.
Figure 6C:
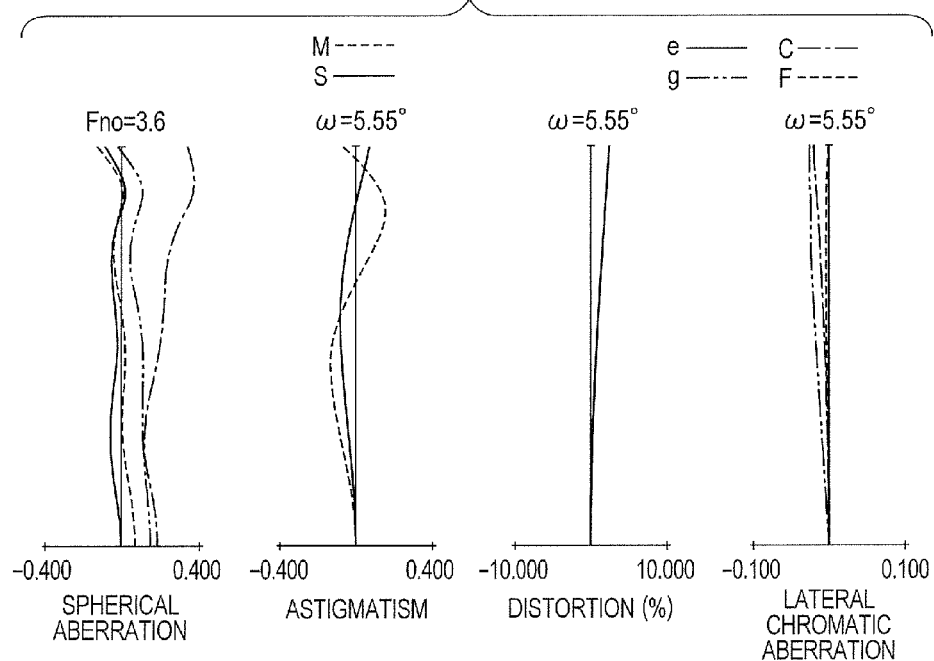
FIG. 6C is an aberration diagram when focusing on the infinite object at a telephoto end of the zoom lens according to Numerical Embodiment 3 of the present invention.

FIG. 5 is a lens cross-sectional view of a zoom lens according to Embodiment 3 (Numerical Embodiment 3) of the present invention at a wide angle end (focal length f=20.00 mm) when focusing on an infinite object. FIGS. 6A, 6B, and 6C are aberration diagrams respectively at the wide angle end, at an intermediate zoom position (focal length f=60.00 mm), and at a telephoto end (focal length f=160.00 mm) of the zoom lens according to Numerical Embodiment 3 when focusing on an infinite object.

Figure 7:
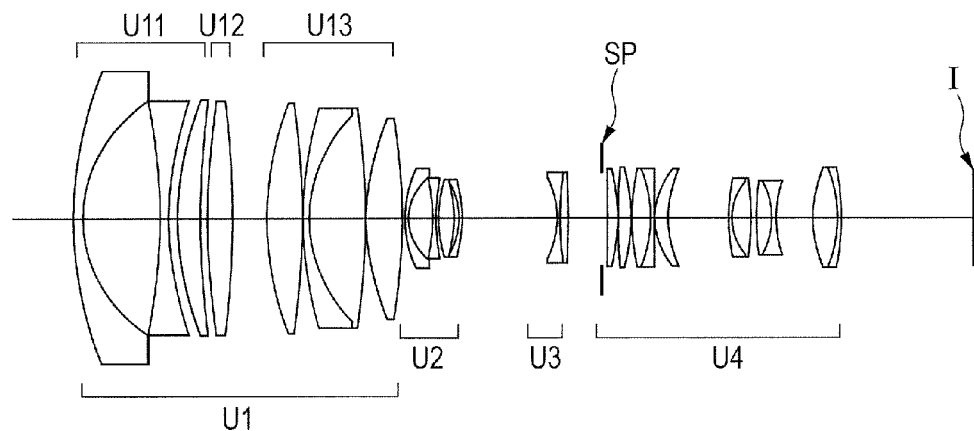
FIG. 7 is a lens cross-sectional view when focusing on an infinite object at a wide angle end of a zoom lens according to Numerical Embodiment 4 of the present invention.
Figure 8A:
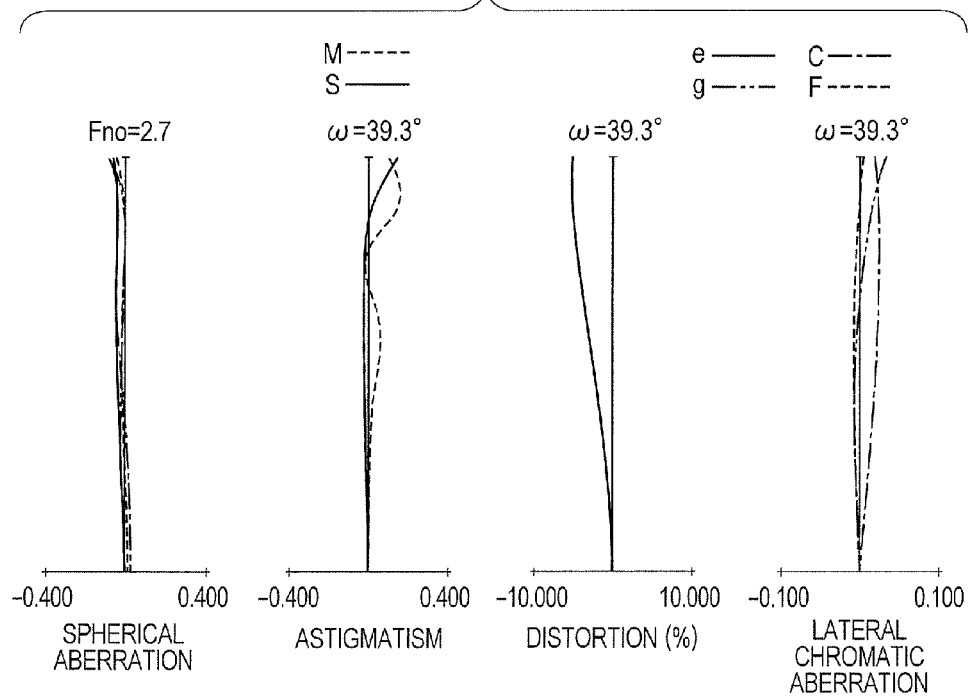
FIG. 8A is an aberration diagram when focusing on the infinite object at the wide angle end of the zoom lens according to Numerical Embodiment 4 of the present invention.
Figure 8B:
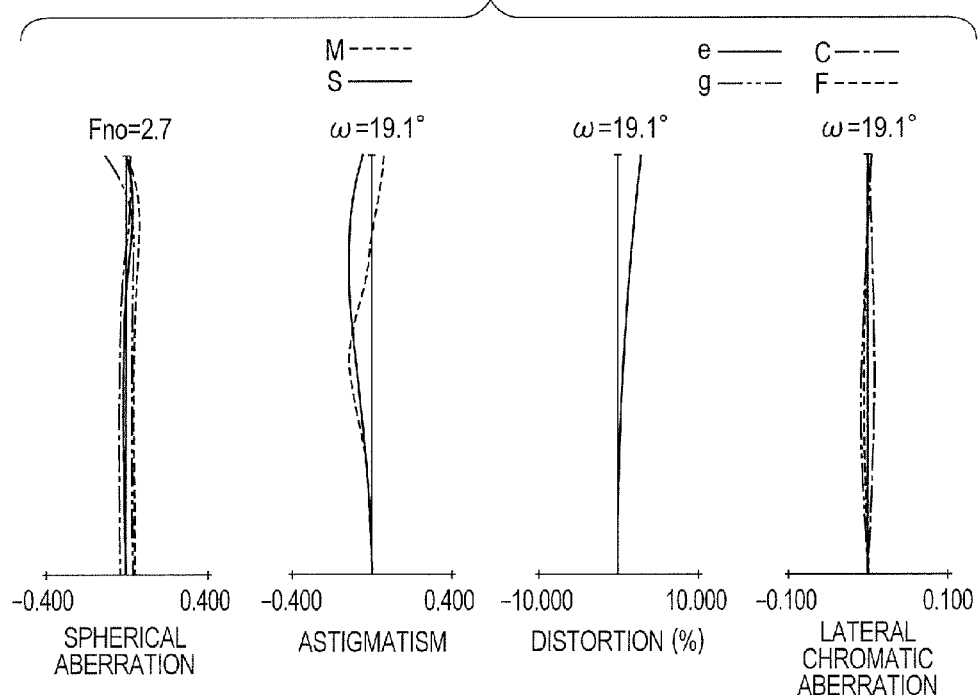
FIG. 8B is an aberration diagram when focusing on the infinite object at an intermediate zoom position of the zoom lens according to Numerical Embodiment 4 of the present invention.
Figure 8C:
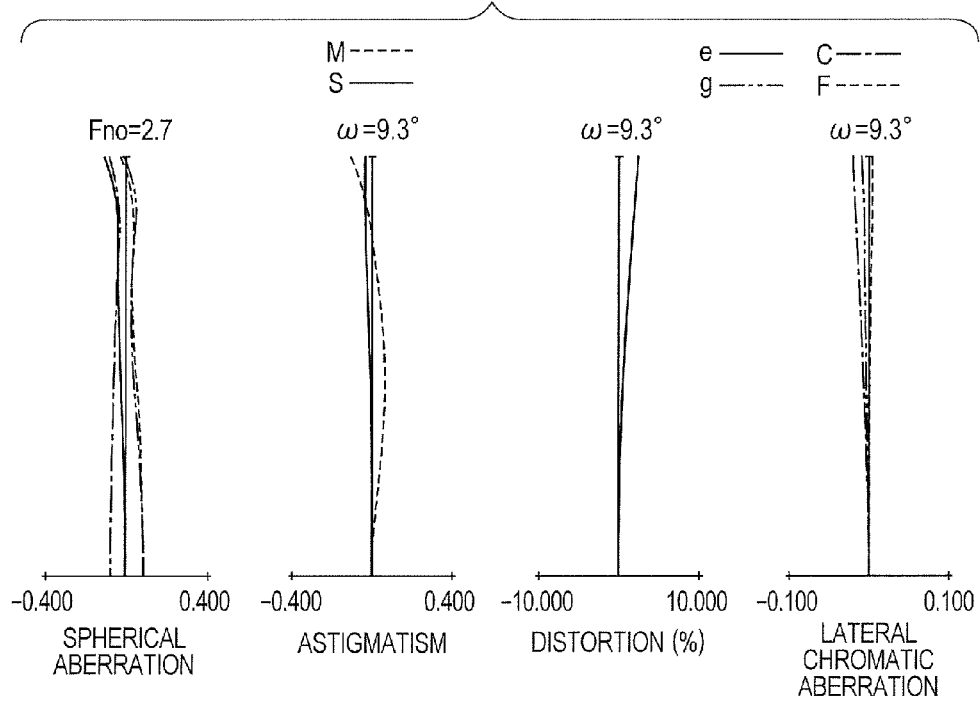
FIG. 8C is an aberration diagram when focusing on the infinite object at a telephoto end of the zoom lens according to Numerical Embodiment 4 of the present invention.

FIG. 7 is a lens cross-sectional view of a zoom lens according to Embodiment 4 (Numerical Embodiment 4) of the present invention at a wide angle end (focal length f=19.00 mm) when focusing on an infinite object. FIGS. 8A, 8B, and 8C are aberration diagrams respectively at the wide angle end, at an intermediate zoom position (focal length f=45.00 mm), and at a telephoto end (f=95.00 mm) of the zoom lens according to Numerical Embodiment 4 when focusing on an infinite object.

Figure 10B:
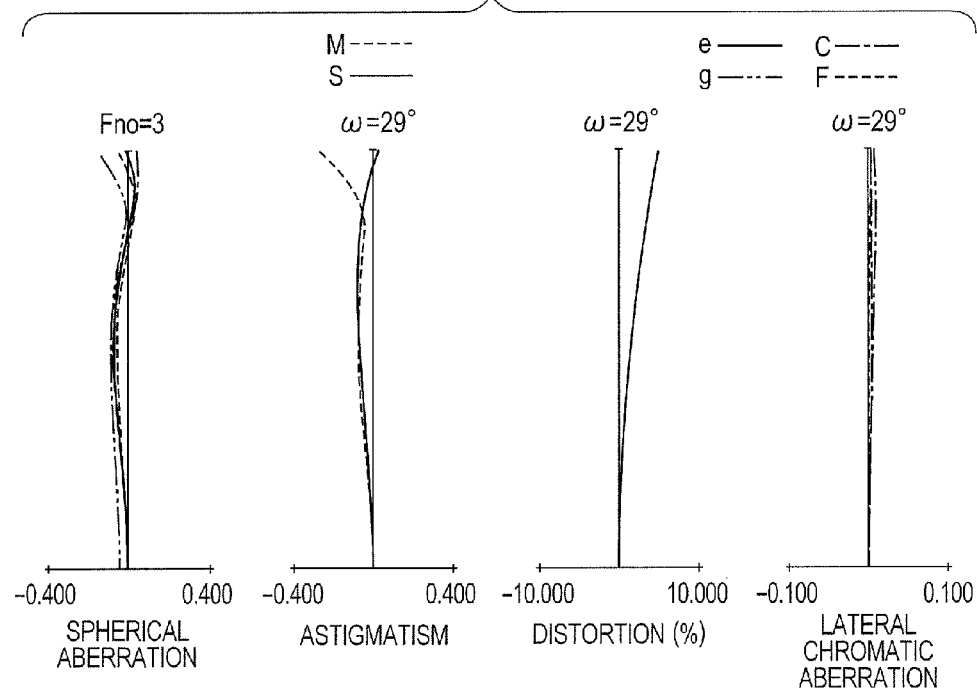
FIG. 10B is an aberration diagram when focusing on the infinite object at an intermediate zoom position of the zoom lens according to Numerical Embodiment 5 of the present invention.
Figure 10C:
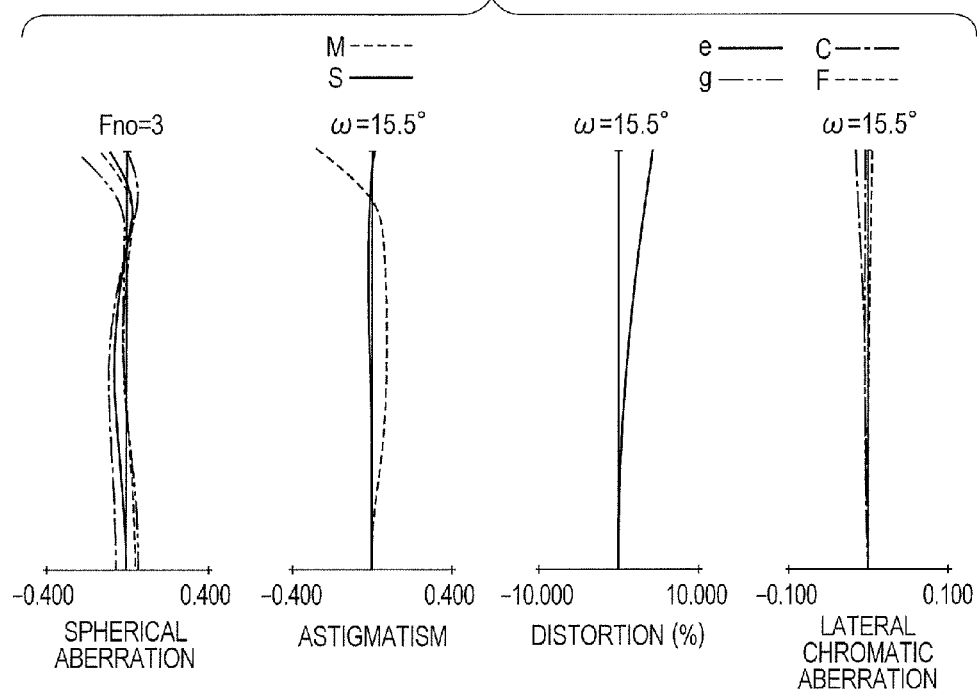
FIG. 10C is an aberration diagram when focusing on the infinite object at a telephoto end of the zoom lens according to Numerical Embodiment 5 of the present invention.

FIG. 9 is a lens cross-sectional view of a zoom lens according to Embodiment 5 (Numerical Embodiment 5) of the present invention at a wide angle end (focal length f=14 mm) when focusing on an infinite object. FIGS. 10A, 10B, and 10C are aberration diagrams respectively at the wide angle end, at an intermediate zoom position (focal length f=28.00 mm), and at a telephoto end (focal length f=56.00 mm) of the zoom lens according to Numerical Embodiment 5 when focusing on an infinite object.

Figure 11:
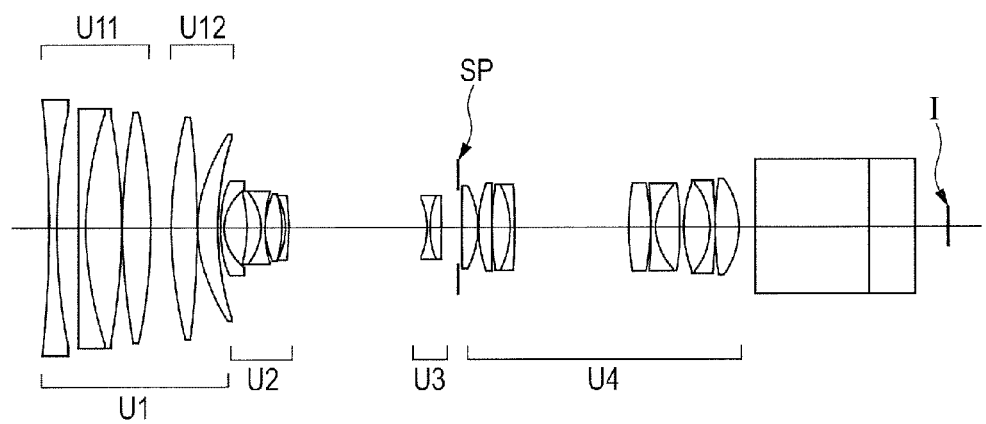
FIG. 11 is a lens cross-sectional view when focusing on an infinite object at a wide angle end of a zoom lens according to Numerical Embodiment 6 of the present invention.
Figure 12A:
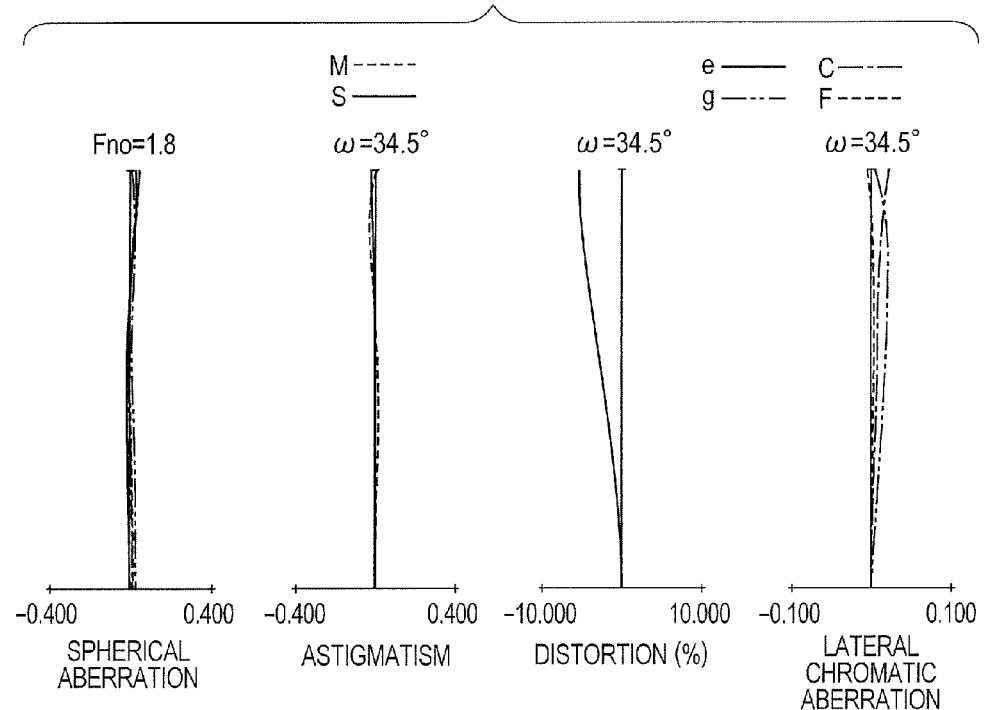
FIG. 12A is an aberration diagram when focusing on the infinite object at the wide angle end of the zoom lens according to Numerical Embodiment 6 of the present invention.
Figure 12B:
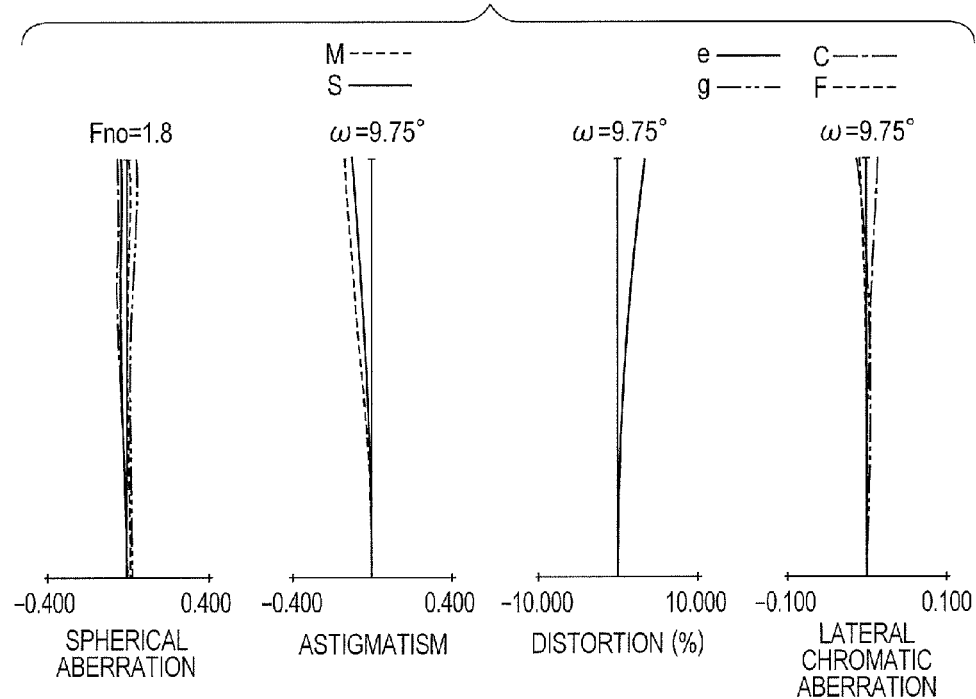
FIG. 12B is an aberration diagram when focusing on the infinite object at an intermediate zoom position of the zoom lens according to Numerical Embodiment 6 of the present invention.
Figure 12C:
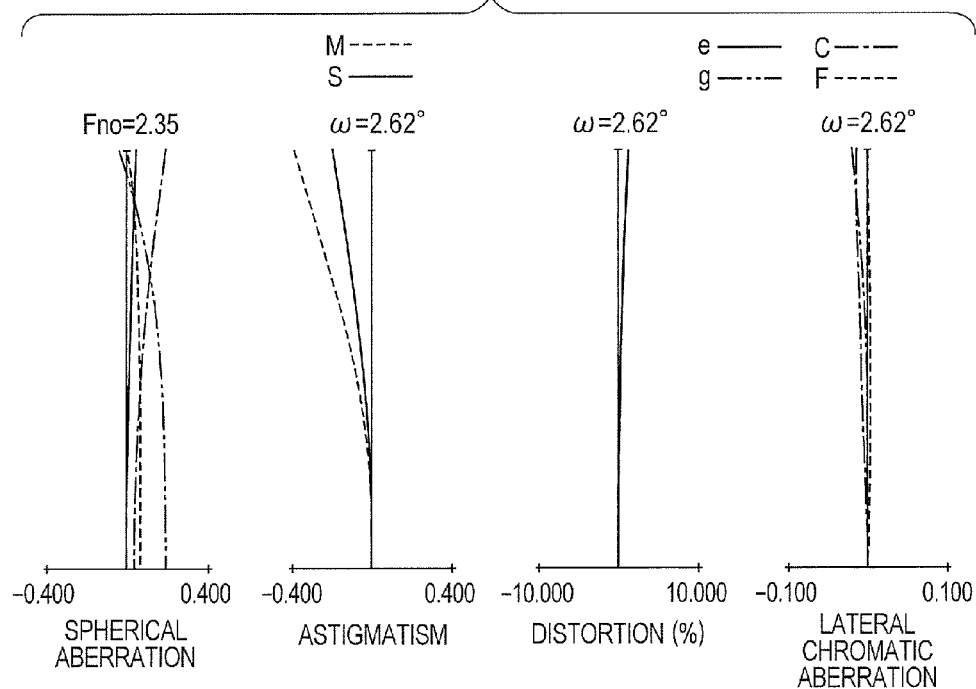
FIG. 12C is an aberration diagram when focusing on the infinite object at a telephoto end of the zoom lens according to Numerical Embodiment 6 of the present invention.

FIG. 11 is a lens cross-sectional view of a zoom lens according to Embodiment 6 (Numerical Embodiment 6) of the present invention at a wide angle end (focal length f=8.00 mm) when focusing on an infinite object. FIGS. 12A, 12B, and 12C are aberration diagrams respectively at the wide angle end, at an intermediate zoom position (focal length f=32.00 mm), and at a telephoto end (focal length f=120.00 mm) of the zoom lens according to Numerical Embodiment 6 when focusing on an infinite object.

Figure 13:
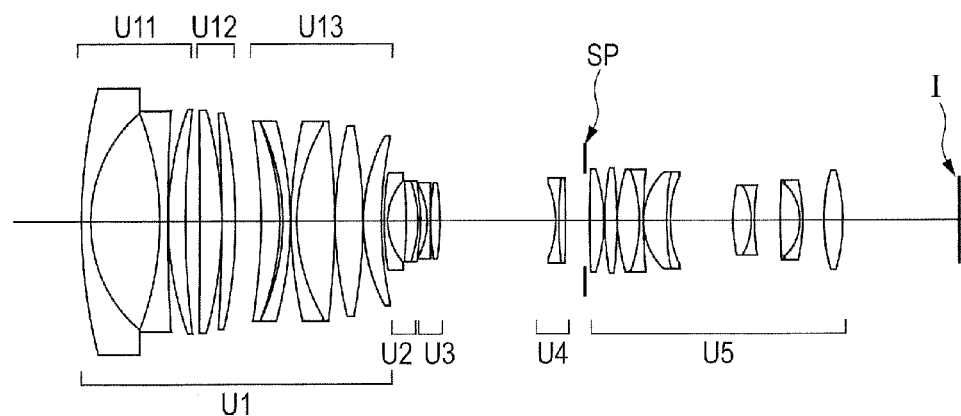
FIG. 13 is a lens cross-sectional view when focusing on an infinite object at a wide angle end of a zoom lens according to Numerical Embodiment 7 of the present invention.
Figure 14A:
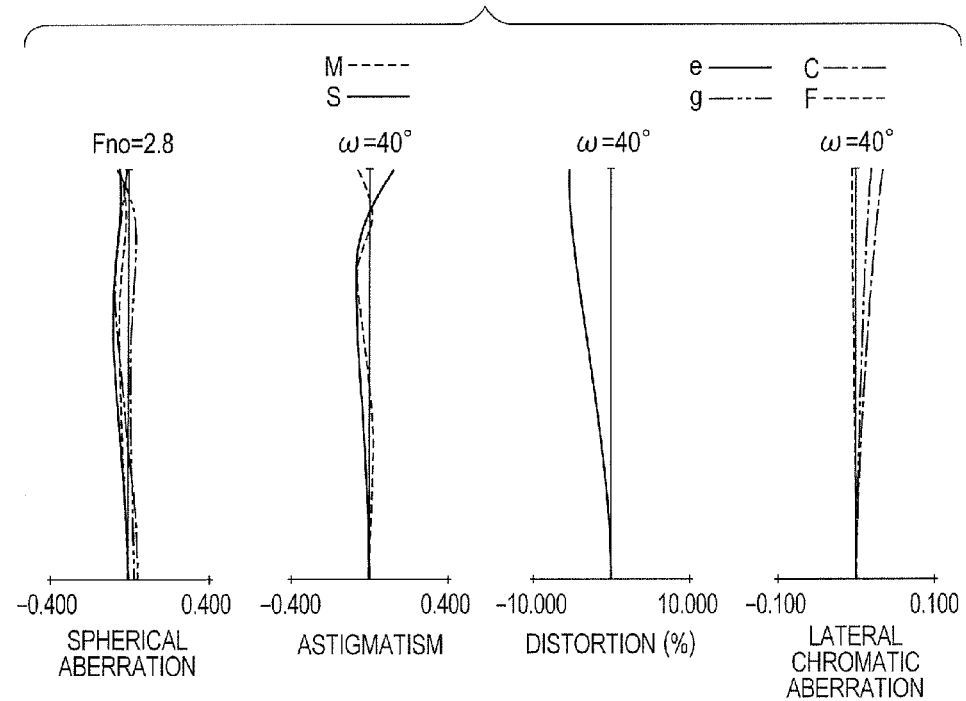
FIG. 14A is an aberration diagram when focusing on the infinite object at the wide angle end of the zoom lens according to Numerical Embodiment 7 of the present invention.
Figure 14B:
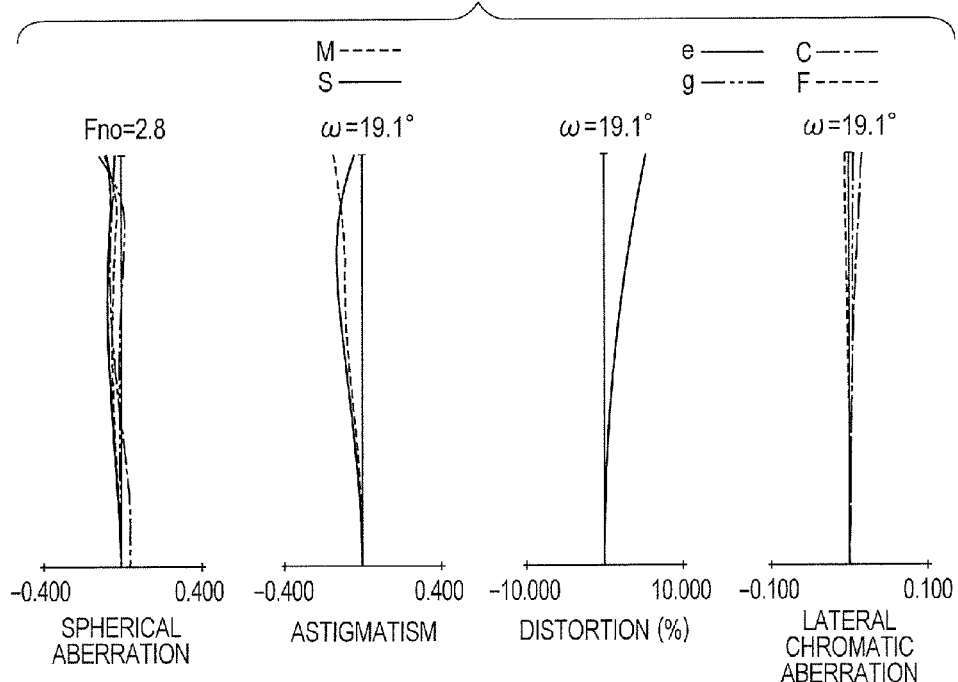
FIG. 14B is an aberration diagram when focusing on the infinite object at an intermediate zoom position of the zoom lens according to Numerical Embodiment 7 of the present invention.
Figure 14C:
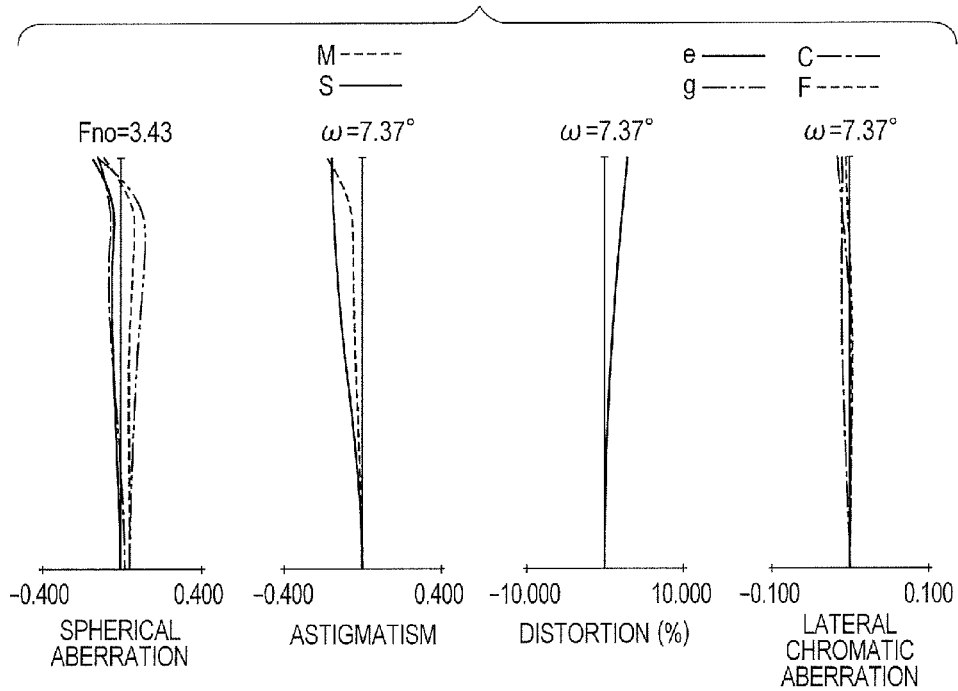
FIG. 14C is an aberration diagram when focusing on the infinite object at a telephoto end of the zoom lens according to Numerical Embodiment 7 of the present invention.

FIG. 13 is a lens cross-sectional view of a zoom lens according to Embodiment 7 (Numerical Embodiment 7) of the present invention at a wide angle end (focal length f=18.50 mm) when focusing on an infinite object. FIGS. 14A, 14B, and 14C are aberration diagrams respectively at the wide angle end, at an intermediate zoom position (focal length f=45.00 mm), and at a telephoto end (focal length f=120.25 mm) of the zoom lens according to Numerical Embodiment 7 when focusing on an infinite object.

Figure 15:
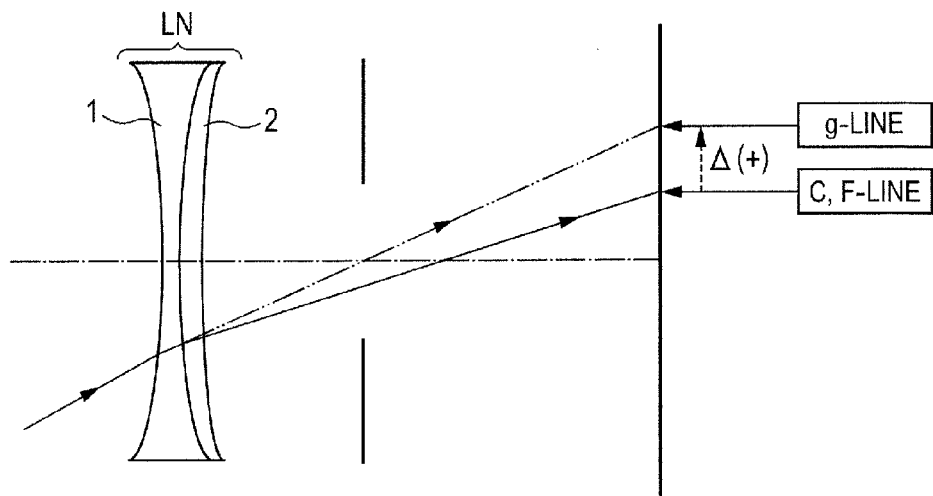
FIG. 15 is a schematic diagram illustrating a main part of an image pickup apparatus of the present invention.

FIG. 15 illustrates the principle of correction of a secondary spectrum of a lateral chromatic aberration.

Figure 16:
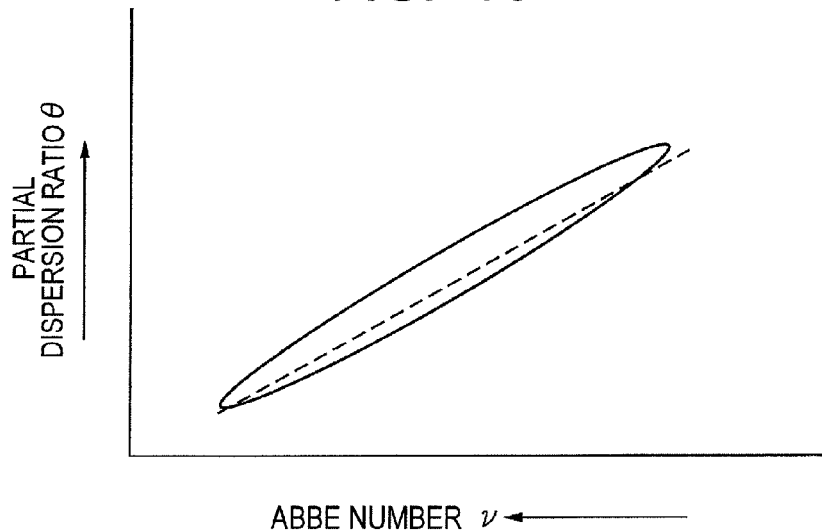
FIG. 16 is a schematic graph showing a distribution of an Abbe number and a partial dispersion ratio of optical materials.

FIG. 16 is a schematic graph showing a distribution of an Abbe number ν and a partial dispersion ratio θ of optical materials.

Figure 17:
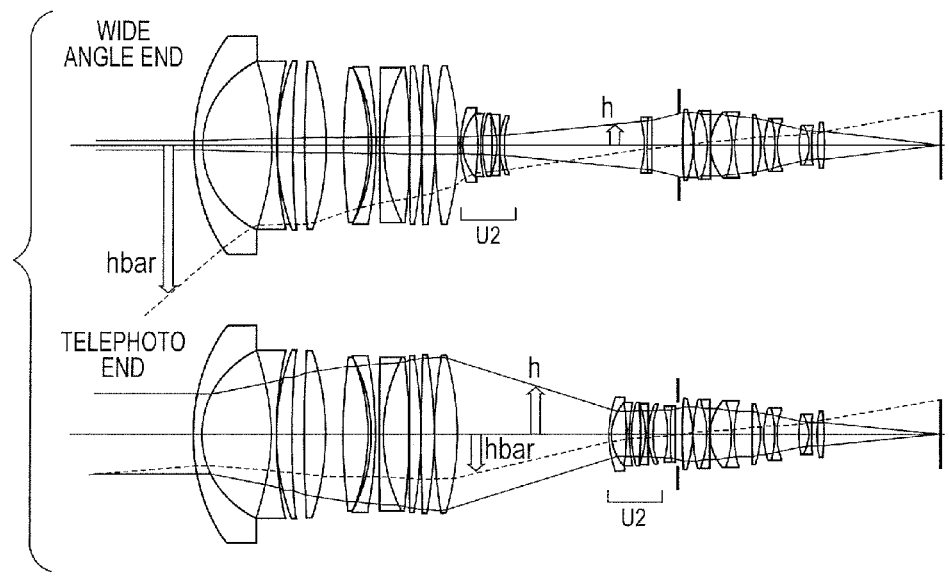
FIG. 17 is an optical path diagram at a wide angle end and at a telephoto end of the zoom lens of the present invention.

FIG. 17 is an optical path diagram at a wide angle end and at a telephoto end of the zoom lens of the present invention.

Figure 18:
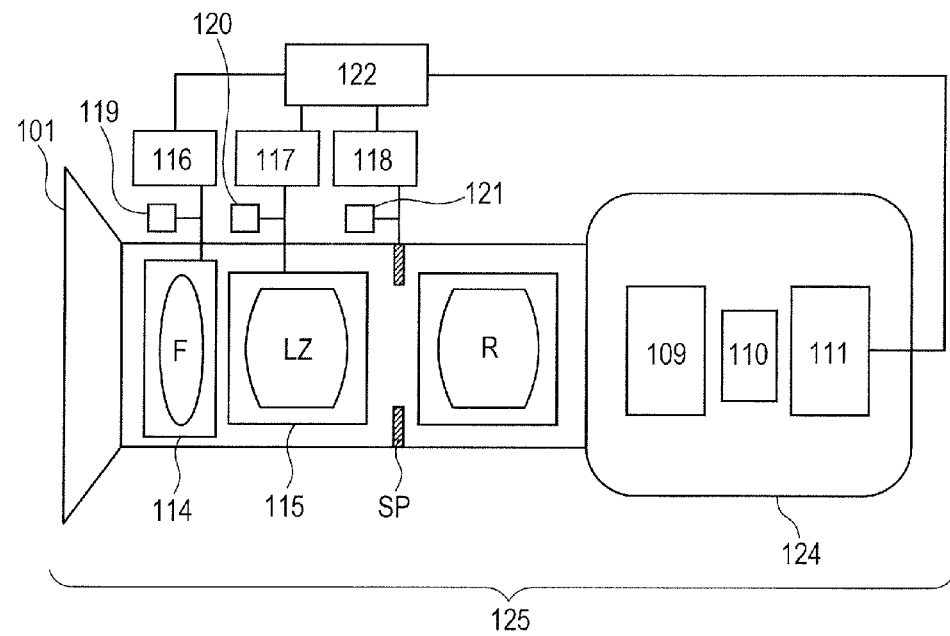
FIG. 18 is a schematic diagram illustrating a main part of the image pickup apparatus of the present invention.

FIG. 18 is a schematic diagram illustrating a main part of an image pickup apparatus of the present invention.

In each lens cross-sectional view, the left side is the subject (object) side (front), and the right side is the image side (rear). In the lens cross-sectional view, a first lens unit (front lens unit) U1 has a positive refractive power and does not move for zooming. A focus lens unit U12 in the first lens unit U1 moves to the image side in FIGS. 1, 3, 5, 7, 9, and 13 during focusing from an infinite object to a short-distance object, and moves to the object side in FIG. 11 during focusing from the infinite object to the short-distance object. Fixed lens units U11 and U13 in the first lens unit U1 do not move for focusing. In FIGS. 1, 3, 5, 7, 9, and 11, a second lens unit U2 and a third lens unit U3 each has a negative refractive power and move during zooming. The two lens units: the second lens unit U2; and the third lens unit U3 construct a zoom optical system. A fourth lens unit U4 (relay lens unit) has a positive refractive power and an imaging action, and does not move for zooming. In FIG. 13, a second lens unit U2, a third lens unit U3, and a fourth lens unit U4 each have a negative refractive power and move during zooming. The three lens units: the second lens unit U2; the third lens unit U3; and the fourth lens unit U4 construct a zoom optical system. A fifth lens unit U5 (relay lens unit) has a positive refractive power and an imaging action, and does not move for zooming.

A stop (aperture stop) SP is arranged. When used as an image pickup optical system for a broadcasting television camera, a movie camera, a video camera, or a digital still camera, an image pickup surface I corresponds to an image pickup surface of a solid-state image pickup element (photoelectric conversion element) or the like for receiving an image formed by the zoom lens and converting light to electricity. When used as an image pickup optical system for a film camera, the image pickup surface I corresponds to a film surface on which the image formed by the zoom lens is exposed.

In the aberration diagrams, a straight line, a two-dot chain line, a dashed line, and a broken line in a spherical aberration indicate an e-line, a g-line, a C-line, and an F-line, respectively. A broken line and a solid line in astigmatism indicate a meridional image plane and a sagittal image plane, respectively. In addition, a two-dot chain line, a dashed line, and a broken line in a lateral chromatic aberration indicate a g-line, a C-line, and an F-line, respectively. Symbol A represents a half angular field of view, and symbol Fno represents an F number. Note that, in the following embodiments, the case where a lens unit for zooming is located at the shortest focal length side is referred to as "wide angle end", and the case where a lens unit for zooming is located at the longest focal length side is referred to as "telephoto end".

In each of the embodiments, the zoom lens of the present invention includes, in order from the object side to the image side, a first lens unit U1 having a positive refractive power that does not move for zooming and a second lens unit U2 having a negative refractive power that moves during zooming. The zoom lens further includes an N-th lens unit UN having a positive refractive power, which is arranged closest to the image side and which does not move for zooming. Two lenses closest to the image side of the second lens unit U2 include a positive lens and a negative lens.

In this case, the following conditional expression is satisfied:

$$-3.0 \times 10^{-3} < (\theta p - \theta n)/(\nu p - \nu n) < 0 \qquad (1)$$

where θp and νp respectively represent a partial dispersion ratio and an Abbe number of the positive lens of the second lens unit U2, and θn and νn respectively represent a partial dispersion ratio and an Abbe number of the negative lens of the second lens unit U2.

In this case, symbols νp and νn represent the Abbe numbers for the d-line and symbols θp and θn represent the partial dispersion ratios for the g-line and the F-line.

The zoom lens of each of the embodiments has a feature in that the conditions of the lens structure and the dispersion characteristics of the materials of the lenses in the second lens unit U2 are appropriately defined. Here, the conditional expression (1) represents a condition under which the secondary spectrum of the lateral chromatic aberration is appropriately corrected in all the focal lengths. In the zoom lens of each of the embodiments, the lens structure and the dispersion characteristics of the materials of the lenses in the second lens unit U2 are important factors for satisfactorily correcting the secondary spectrum of the lateral chromatic aberration in all the focal lengths. By satisfying the conditional expression (1), a residual secondary spectrum of the lateral chromatic aberration is reduced in the second lens unit U2. As a result, the secondary spectrum of the lateral chromatic aberration is reduced at the wide angle end. In general, the secondary spectrum of the lateral chromatic aberration remains in a direction of being apart from the optical axis at the wide angle end, and remains in a direction of being closer to the optical axis at the telephoto end. Therefore, the secondary spectrum of the lateral chromatic aberration of the second lens unit U2 is increased by reducing the residual secondary spectrum of the lateral chromatic aberration of the second lens unit U2. However, a correction amount of secondary spectrum at the wide angle end is more than the residual secondary spectrum of the lateral chromatic aberration at the telephoto end, and hence the zoom variation of the lateral chromatic aberration is corrected.

FIG. 15 is a schematic diagram about dichroic achromatism by a lens unit LN having a negative refractive power, and the residual secondary spectrum. FIG. 16 is a schematic graph showing a distribution of the Abbe number ν and the partial dispersion ratio θ of the existing optical materials. Here, the Abbe number ν and the partial dispersion ratio θ are respectively expressed as follows:

$$\nu = (nd-1)/(nF-nC) \quad (i)$$

$$\theta = (ng-nF)/(nF-nC) \quad (ii)$$

where ng represents a refractive index for the g-line, nF represents a refractive index for the F-line, nd represents a refractive index for the d-line, and nC represents a refractive index for the C-line. As shown in FIG. 16, in the existing optical materials, the partial dispersion ratio θ distributes in a narrower range than that of the Abbe number ν. Hence, the existing optical materials have such a tendency that the partial dispersion ratio θ is large as the Abbe number ν becomes smaller.

A correction condition of the lateral chromatic aberration of a thin lens system (having a combined refractive power φ) including two lenses G1 and G2 whose refractive powers are represented by φ1 and φ2, respectively, and whose Abbe numbers of the materials are represented by ν1 and ν2, respectively, is expressed as follows.

$$\phi 1/\nu 1 + \phi 2/\nu 2 = E \quad (iii)$$

$$\phi = \phi 1 + \phi 2 \quad (iv)$$

When E=0 in the expression (iii), the image formation positions of the C-line and the F-line are matched with each other.

In FIG. 15, for the achromatism by the lens unit LN having the negative refractive power, a material having a smaller Abbe number ν1 is used as the positive lens G1, and a material having a larger Abbe number ν2 is used as the negative lens G2. Therefore, with reference to FIG. 16, the positive lens G1 becomes larger in the partial dispersion ratio θ 1 and the negative lens G2 becomes smaller in the partial dispersion ratio θ 2. Under this condition, if the lateral chromatic aberration is corrected for the F-line and the C-line, the image formation point of the g-line deviates to the image side. When this deviation amount is defined as a secondary spectrum amount Δ, the secondary spectrum amount Δ is expressed as follows.

$$\Delta = -(1/\phi) \times (\theta 1 - \theta 2)/(\nu 1 - \nu 2) \quad (v)$$

In addition, an amount Y of lateral chromatic aberration is expressed as follows:

$$Y = -(\Sigma(h \times hbar \times E)) \tan \omega \quad (vi)$$

where h represents an axial marginal ray height in each plane, and hbar represents a pupil paraxial ray height in each plane. In other words, the amount Y of lateral chromatic aberration is proportional to the product of the axial marginal ray height h and the pupil paraxial ray height hbar.

FIG. 17 illustrates an optical path diagram at the wide angle end and at the telephoto end. In this case, the axial marginal beam is indicated by a solid line, and the pupil paraxial ray is indicated by a broken line. In the second lens unit U2, the axial marginal ray height h is successively lowered from the object side to the image side, and the pupil paraxial ray height hbar is successively raised from the object side to the image side. In addition, the product of the axial marginal ray height h and the pupil paraxial ray height hbar in each lens of the second lens unit U2 is hardly changed. In other words, in the second lens unit U2, there is almost no difference in the correction amounts of lateral chromatic aberration depending on the lens positions.

On the other hand, at the telephoto end, the axial marginal ray height is successively raised from the object side to the image side, and the pupil paraxial ray height is successively lowered from the object side to the image side. In addition, the product of the axial marginal ray height h and the pupil paraxial ray height hbar in each lens of the second lens unit U2 is smaller in the lens on the image side than the lens on the object side. The reason for this is because the second lens unit U2 approaches the aperture stop at the telephoto end so that the pupil paraxial ray height hbar is low. Therefore, in order to correct the zoom variation of the secondary spectrum of the lateral chromatic aberration, it is effective to select the suitable material for the lens on the image side of the second lens unit U2. Specifically, it is preferred that the lens having a smaller partial dispersion ratio be used as the positive lens on the image side, and the lens having a larger partial dispersion ratio be used as the negative lens on the image side.

If (θp−θn)/(νp−νn) in the conditional expression (1) exceeds an upper limit, an amount of secondary spectrum to be corrected in the second lens unit U2 is decreased at the telephoto end, and hence it becomes difficult to satisfactorily correct the axial chromatic aberration. On the other hand, if (θp−θn)/(νp−νn) in the conditional expression (1) exceeds a lower limit, the amount of secondary spectrum of the second lens unit U2 is increased at the wide angle end. As a result, it becomes difficult to satisfactorily correct the lateral chromatic aberration at the wide angle end and the zoom variation of the lateral chromatic aberration.

It is more preferred to set the numerical value range of the conditional expression (1) as follows.

$$-2.9 \times 10^{-3} < (\theta p - \theta n)/(\nu p - \nu n) < -1.0 \times 10^{-3} \quad (1a)$$

Moreover, the zoom lens of the present invention satisfies the following conditional expression:

$$1.7 < nave < 2.0 \quad (2)$$

where nave represents an average value of the refractive indices of all the lenses in the second lens unit U2.

The conditional expression (2) defines an average refractive index of all the lenses in the second lens unit U2. In the zoom lens of each of the embodiments, the average refractive index of all the lenses in the second lens unit U2 is set for suppressing the increase in size of the lens and correcting various aberrations. By satisfying the conditional expression (2), the zoom lens in which the various aberrations can be satisfactorily corrected can be obtained while the increase in size of the lens is suppressed.

If nave in the conditional expression (2) exceeds an upper limit, in the existing optical materials, a difference in Abbe number between the positive lens and the negative lens is decreased. As a result, as shown in the expressions (iii) and (iv), the refractive powers of the lenses in the second lens unit U2 are increased. Therefore, it becomes difficult to satisfactorily correct the various aberrations, especially, the off-axis aberration variation on the wide angle side and the spherical aberration variation on the telephoto side. On the other hand, if nave in the conditional expression (2) exceeds a lower limit, the refractive powers of the lenses in the second lens unit U2 cannot be increased. As a result, the movement amount required for zooming is increased, which leads to the increase in size of the lens.

It is more preferred to set the numerical value range of the conditional expression (2) as follows.

$$1.74 < nave < 1.95 \quad (2a)$$

By satisfying the above-mentioned conditions, each of the embodiments of the present invention obtains the small and lightweight zoom lens in which the aberration correction is satisfactorily carried out in the entire zoom range.

In each of the embodiments, it is more preferred to satisfy the following conditional expression:

$$-2.5 < f2/fw < 0 \quad (3)$$

where f2 represents the focal length of the second lens unit, and fw represents the focal length at the wide angle end.

The conditional expression (3) defines a ratio of the focal length of the second lens unit U2 to the focal length at the wide angle end.

If f2/fw in the conditional expression (3) exceeds an upper limit, the focal length of the second lens unit U2 becomes relatively short. As a result, it becomes difficult to attain the suppression of the variation of various off-axis aberrations following zooming on the wide angle side, especially, the suppression of the distortion and the field curvature, and the suppression of the variation of various aberrations following zooming on the telephoto side, especially, the suppression of the spherical aberration. On the other hand, if f2/fw in the conditional expression (3) exceeds a lower limit, the focal length of the second lens unit U2 becomes relatively long. As a result, the movement amount required for zooming is increased, which leads to the increase in size of the entire lens.

It is more preferred to set the numerical value range of the conditional expression (3) as follows.

$$-1.50 < f2/fw < -1.00 \quad (3a)$$

In each of the embodiments, it is more preferred to satisfy the following conditional expression:

$$-5.0 < f1/f2 < 0 \quad (4)$$

where f1 represents the focal length of the first lens unit U1.

The conditional expression (4) defines a ratio of the focal length of the first lens unit U1 to the focal length of the second lens unit U2.

If f1/f2 in the conditional expression (4) exceeds an upper limit, the focal length of the first lens unit U1 becomes relatively short. As a result, the correction of the various aberrations, especially, the correction of the chromatic aberration at the telephoto end becomes difficult to attain. In addition, the performance reduction due to manufacturing fluctuations becomes larger because a manufacturing error greatly affects the performance.

On the other hand, if f1/f2 in the conditional expression (4) exceeds a lower limit, the focal length of the first lens unit U1 becomes relatively short. As a result, the movement amount required for zooming is increased, which leads to the increase in size of the entire lens.

It is more preferred to set the numerical value range of the conditional expression (4) as follows.

$$-2.55 < f1/f2 < -1.00 \quad (4a)$$

In each of the embodiments, it is more preferred to include at least one positive lens that satisfies the following conditional expressions:

$$1.8 < ni < 2.2 \quad (5)$$

$$15 < vi < 30 \quad (6)$$

where ni represents a refractive index of an i-th lens counted from the object side to the image side of the second lens unit U2, and vi represents an Abbe number thereof. In this case, symbol ni is the refractive index for the d-line, and symbol vi is the Abbe number for the d-line.

The conditional expression (5) defines the refractive index of the at least one positive lens included in the second lens unit U2.

If ni in the conditional expression (5) exceeds an upper limit, noise is easily generated in a blue subject when the sensitivity correction is carried out by using the camera because in the existing optical materials, especially, a transmittance on the short wavelength side is low. On the other hand, if ni in the conditional expression (5) exceeds a lower limit, this leads to deterioration of various aberrations or an increase in the number of lenses.

The conditional expression (6) defines the Abbe number of the at least one positive lens included in the second lens unit U2.

If vi in the conditional expression (6) exceeds an upper limit, as shown in the expressions (iii) and (iv), in order to match the image formation positions of the C-line and the F-line with each other, the positive lens of the second lens unit U2 needs to have a small Abbe number, and hence the chromatic aberration remains.

On the other hand, if vi in the conditional expression (6) exceeds a lower limit, as shown in FIG. 16, because the existing optical materials have such a tendency that the partial dispersion ratio becomes larger as the Abbe number becomes smaller, it becomes difficult to satisfactorily correct the zoom variation of the lateral chromatic aberration.

It is more preferred to set the numerical value ranges of the conditional expressions (5) and (6) as follows.

$$1.82 < ni < 2.05 \quad (5a)$$

$$20 < vi < 27 \quad (6a)$$

In each of the embodiments, it is more preferred to include at least one positive lens that satisfies the following conditional expression:

$$0.648 < \theta i + 2.53 \times 10^{-3} \times vi < 0.678 \qquad (7)$$

where θi represents the partial dispersion ratio for the g-line and the F-line of the i-th lens counted from the object side to the image side of the second lens unit U2, and vi represents the Abbe number for the d-line of the i-th lens.

The conditional expression (7) defines the partial dispersion ratio of the at least one positive lens included in the second lens unit U2.

If $\theta i + 2.53 \times 10^{-3} \times vi$ in the conditional expression (7) exceeds an upper limit, as shown in the expression (v), the secondary spectrum amount of the second lens unit U2 is increased at the wide angle end. As a result, it becomes difficult to satisfactorily correct the lateral chromatic aberration at the wide angle end and the zoom variation of the lateral chromatic aberration.

On the other hand, if $\theta i + 2.53 \times 10^{-3} \times vi$ in the conditional expression (7) exceeds a lower limit, as shown in the expression (v), the secondary spectrum amount corrected by the second lens unit U2 is reduced at the telephoto end. As a result, it becomes difficult to satisfactorily correct the axial chromatic aberration.

It is more preferred to set the numerical value range of the conditional expression (7) as follows.

$$0.658 < \theta i + 2.53 \times 10^{-3} \times vi < 0.670 \qquad (7a)$$

In each of the embodiments, it is more preferred that the positive lens satisfying the conditional expressions (5) to (7) be a positive lens closest to the object side of the second lens unit U2. As a result, the zoom variation of the secondary spectrum of the lateral chromatic aberration is easily corrected.

In each of the embodiments, it is more preferred that the second lens unit U2 include three negative lenses and one positive lens. As a result, the suppression of various aberrations, especially, the correction of the zoom variation of various off-axis aberrations on the wide angle side is easily carried out.

In Numerical Embodiment 7, the zoom lens includes, in order from the object side to the image side, a first lens unit U1 having a positive refractive power that does not move for zooming, a second lens unit U2 having a negative refractive power that moves during zooming, and a third lens unit U3 that moves during zooming. In addition, the zoom lens further includes an N-th lens unit UN having a positive refractive power, which is arranged closest to the image side and which does not move for zooming. Of the lenses constructing the second lens unit U2 and the third lens unit U3, two lenses closest to the image side are a positive lens and a negative lens. Specifically, two lenses closest to the image side of the third lens unit U3, or lenses closest to the image side of the third lens unit U3 and the second lens unit U2 when the third lens unit U3 includes one lens, are a positive lens and a negative lens. In this case, the following conditional expression is satisfied:

$$-3.0 \times 10^{-3} < (\theta p23 - \theta n23)/(vp23 - vn23) < 0 \qquad (8)$$

where θp23 and vp23 respectively represent the partial dispersion ratio and the Abbe number of the positive lens, and θn23 and vn23 respectively represent the partial dispersion ratio and the Abbe number of the negative lens.

In this case, symbols vp23 and vn23 represent the Abbe numbers for the d-line, and symbols θp23 and θn23 represent the partial dispersion ratios for the g-line and the F-line.

If $(\theta p23 - \theta n23)/(vp23 - vn23)$ in the conditional expression (8) exceeds an upper limit, the secondary spectrum amount corrected by the second lens unit U2 and the third lens unit U3 is reduced at the telephoto end. As a result, it becomes difficult to satisfactorily correct the axial chromatic aberration. On the other hand, if $(\theta p23 - \theta n23)/(vp23 - vn23)$ in the conditional expression (8) exceeds a lower limit, the secondary spectrum amounts of the second lens unit U2 and the third lens unit U3 are increased at the wide angle end. As a result, it becomes difficult to satisfactorily correct the lateral chromatic aberration at the wide angle end and the zoom variation of the lateral chromatic aberration.

It is more preferred to set the numerical value range of the conditional expression (8) as follows.

$$-2.9 \times 10^{-3} < (\theta p23 - \theta n23)/(vp23 - vn23) < -1.0 \times 10^{-3} \qquad (8a)$$

In addition, the zoom lens of Embodiment 7 satisfies the following conditional expression:

$$1.7 < nave23 < 2.0 \qquad (9)$$

where nave23 represents an average value of the refractive indices of all the lenses in the second lens unit U2 and the third lens unit U3.

The conditional expression (9) defines an average refractive index of all the lenses in the second lens unit U2 and the third lens unit U3. In the zoom lens of Embodiment 7, the average refractive index of all the lenses in the second lens unit U2 and the third lens unit U3 is set for suppressing the increase in size of the lens and correcting various aberrations. By satisfying the conditional expression (9), the zoom lens in which the various aberrations can be satisfactorily corrected can be obtained while the increase in size of the lens is suppressed.

If nave23 in the conditional expression (9) exceeds an upper limit, in the existing optical materials, a difference in Abbe number between the positive lens and the negative lens is decreased. As a result, as shown in the expressions (iii) and (iv), the refractive powers of the lenses in the second lens unit U2 and the third lens unit U3 are increased. Therefore, it becomes difficult to satisfactorily correct the various aberrations, especially, the variation of the off-axis aberration on the wide angle side and the variation of the spherical aberration on the telephoto side. On the other hand, if nave23 in the conditional expression (9) exceeds a lower limit, the refractive powers of the lenses in the second lens unit U2 and the third lens unit U3 cannot be increased. As a result, the movement amount required for zooming is increased, and hence the lens is increased in size.

It is more preferred to set the numerical value range of the conditional expression (9) as follows.

$$1.74 < nave23 < 1.95 \qquad (9a)$$

It is more preferred that the zoom lens in Embodiment 7 include a third lens unit U3 having a negative refractive power, which moves for zooming and satisfies the following conditional expression:

$$-2.5 < f23/fw < 0 \qquad (10)$$

where f23 represents a combined focal length at the wide angle end of the second lens unit U2 and the third lens unit U3.

The conditional expression (10) defines a ratio of the combined focal length at the wide angle end of the second lens unit U2 and the third lens unit U3 to the focal length at the wide angle end.

If f23/fw in the conditional expression (10) exceeds an upper limit, the combined focal length f23 at the wide angle end becomes relatively short. As a result, it becomes difficult to attain the suppression of the variation of various off-axis aberrations following zooming on the wide angle side, especially, the suppression of the distortion and the field curvature, and the suppression of the variation of various aberrations following zooming on the telephoto side, especially, the suppression of the spherical aberration. On the other hand, if f23/fw in the conditional expression (10) exceeds a lower limit, the combined focal length f23 at the wide angle end becomes relatively long. As a result, the movement amount required for zooming is increased, which leads to the increase in size of the entire lens.

It is more preferred to set the numerical value range of the conditional expression (10) as follows.

$$-1.50 < f23/fw < -1.00 \quad (10a)$$

It is more preferred that the zoom lens in Embodiment 7 include a third lens unit U3 having a negative refractive power, which moves for zooming and satisfies the following conditional expression:

$$-5.0 < f1/f23 < 0 \quad (11)$$

where f23 represents the combined focal length at the wide angle end of the second lens unit U2 and the third lens unit U3.

The conditional expression (11) defines a ratio of the focal length at the wide angle end of the second lens unit U2 and the third lens unit U3 to that of the first lens unit U1.

If f1/f23 in the conditional expression (11) exceeds an upper limit, the focal length of the first lens unit U1 becomes relatively short. As a result, the correction of the various aberrations, especially, the correction of the chromatic aberration at the telephoto end becomes difficult to attain. In addition, the performance reduction due to manufacturing fluctuations becomes larger because a manufacturing error greatly affects the performance.

On the other hand, if f1/f23 in the conditional expression (11) exceeds a lower limit, the focal length of the first lens unit U1 becomes relatively short. As a result, the movement amount required for zooming is increased, which leads to the increase in size of the entire lens.

It is more preferred to set the numerical value range of the conditional expression (11) as follows.

$$-2.55 < f1/f23 < -1.00 \quad (11a)$$

It is more preferred that the zoom lens of Embodiment 7 include at least one positive lens that satisfies the following conditional expressions:

$$1.8 < ni23 < 2.2 \quad (12)$$

$$15 < vi23 < 30 \quad (13)$$

where ni23 represents a refractive index of an i-th lens counted from the object side to the image side of the second lens unit U2 and the third lens unit U3, and vi23 represents an Abbe number thereof. In this case, symbol ni23 is the refractive index for the d-line, and symbol vi23 is the Abbe number for the d-line.

The conditional expression (12) defines the refractive index of the at least one positive lens included in the second lens unit U2 and the third lens unit U3.

If ni23 in the conditional expression (12) exceeds an upper limit, noise is easily generated in a blue subject when the sensitivity correction is carried out by using the camera because in the existing optical materials, especially, a transmittance on the short wavelength side is low. On the other hand, if ni23 in the conditional expression (12) exceeds a lower limit, this leads to deterioration of various aberrations or an increase in the number of lenses.

The conditional expression (13) defines the Abbe number of the at least one positive lens included in the second lens unit U2 and the third lens unit U3.

If vi23 in the conditional expression (13) exceeds an upper limit, as shown in the expressions (iii) and (iv), in order to match the image formation positions of the C-line and the F-line with each other, the positive lens of the second lens U2 and the third lens unit U3 needs to have a small Abbe number, and hence the chromatic aberration remains.

On the other hand, if vi23 in the conditional expression (13) exceeds a lower limit, as shown in FIG. 16, because the existing optical materials have such a tendency that the partial dispersion ratio becomes larger as the Abbe number becomes smaller, it becomes difficult to satisfactorily correct the zoom variation of the lateral chromatic aberration.

It is more preferred to set the numerical value ranges of the conditional expressions (12) and (13) as follows.

$$1.82 < ni23 < 2.05 \quad (12a)$$

$$20 < vi23 < 27 \quad (13a)$$

It is more preferred that the zoom lens of Embodiment 7 include at least one positive lens that satisfies the following conditional expression:

$$0.648 < \theta i23 + 2.53 \times 10^{-3} \times vi23 < 0.678 \quad (14)$$

where $\theta i23$ represents the partial dispersion ratio for the g-line and the F-line of the i-th lens counted from the object side to the image side of the second lens unit U2 and the third lens unit U3, and vi23 represents the Abbe number for the d-line of the i-th lens.

The conditional expression (14) defines the partial dispersion ratio of the at least one positive lens included in the second lens unit U2 and the third lens unit U3.

If $\theta i23 + 2.53 \times 10^{-3} \times vi23$ in the conditional expression (14) exceeds an upper limit, as shown in the expression (v), the secondary spectrum amounts of the second lens unit U2 and the third lens unit U3 are increased at the wide angle end. As a result, it becomes difficult to satisfactorily correct the lateral chromatic aberration at the wide angle end and the zoom variation of the lateral chromatic aberration.

On the other hand, if $\theta i23 + 2.53 \times 10^{-3} \times vi23$ in the conditional expression (14) exceeds a lower limit, as shown in the expression (v), the secondary spectrum amounts corrected by the second lens unit U2 and the third lens unit U3 are reduced at the telephoto end. As a result, it becomes difficult to satisfactorily correct the axial chromatic aberration.

It is more preferred to set the numerical value range of the conditional expression (14) as follows.

$$0.658 < \theta i23 + 2.53 \times 10^{-3} \times vi23 < 0.670 \quad (14a)$$

In the zoom lens of Embodiment 7, it is more preferred that the positive lens satisfying the conditional expressions (12) to (14) be a positive lens closest to the object side of the second lens unit U2 and the third lens unit U3. As a result, the zoom variation of the secondary spectrum of the lateral chromatic aberration is easily corrected.

In each of the zoom lenses of Embodiments 1 to 5 and 7, it is more preferred that the first lens unit U1 include, in order from the object side to the image side, a first sub-lens unit U11 having a negative refractive power that does not move for focusing, a second sub-lens unit U12 having a positive refractive power that moves along the optical axis during focusing, and a third sub-lens unit U13 having a positive refractive power that does not move for focusing. It is preferred to satisfy the following conditional expression:

$$-9.0 < f11/f1 < -0.9 \quad (15)$$

where f11 represents a focal length of the first sub-lens unit U11.

The conditional expression (15) defines a ratio of the focal length of the first sub-lens unit U11 to the focal length of the first lens unit U1.

If f11/f1 in the conditional expression (15) exceeds an upper limit, the focal length of the first sub-lens unit U11 becomes relatively short. As a result, it becomes difficult to attain the suppression of the variation of various off-axis aberrations following zooming on the wide angle side, especially, the suppression of the distortion and the field curvature. On the other hand, if f11/f1 in the conditional expression (15) exceeds a lower limit, the focal length of the first sub-lens unit U11 becomes relatively long. As a result, the lens diameter of the first lens unit U1 is increased, and hence it becomes difficult to attain the wide angle. In addition, it becomes difficult to suppress the change in image field during focusing.

It is more preferred to set the numerical value range of the conditional expression (15) as follows.

$$-1.45 < f11/f1 < -0.95 \quad (15a)$$

It is more preferred that the zoom lens of each of Embodiments 1 to 5 and 7 satisfy the following conditional expression:

$$-1.5 < f13/f11 < -0.5 \quad (16)$$

where f11 represents the focal length of the first sub-lens unit U11, and f13 represents a focal length of the third sub-lens unit U13.

The conditional expression (16) defines a ratio of the focal length of the third sub-lens unit U13 to the focal length of the first sub-lens unit U11.

If f13/f11 in the conditional expression (16) exceeds an upper limit, the focal length of the first sub-lens unit U11 becomes relatively long. As a result, it becomes difficult to make the principal point of the first lens unit U1 approach the image side, and hence the lens diameter of the first lens unit U1 becomes large, and it becomes difficult to attain the wide angle. On the other hand, if f13/f11 in the conditional expression (16) exceeds a lower limit, the focal length of the first sub-lens unit U11 becomes relatively short, which leads to an increase in the number of lenses of the first sub-lens unit U11. As a result, the lens diameter of the first lens unit U1 becomes large, and it becomes difficult to attain the wide angle.

It is more preferred to set the numerical value range of the conditional expression (13) as follows.

$$-1.35 < f13/f11 < -0.80 \quad (16a)$$

In addition, it is preferred that the zoom lens of each of the embodiments satisfy the following conditional expression.

$$1.5 < f1/fw < 9.0 \quad (17)$$

The conditional expression (17) defines a ratio of the focal length of the first lens unit U1 to the focal length at the wide angle end. In the zoom lens of each of the embodiments, the focal length of the first lens unit U1 is the important factor for achieving both the high optical performance and the reduction in size. By satisfying the conditional expression (17), the height of the off-axis ray that passes through the first lens unit U1 can be defined at the wide angle end and the various aberrations can be satisfactorily corrected while the increase in size of the lens is suppressed.

If f1/fw in the conditional expression (17) exceeds an upper limit, the refractive power of the first lens unit U1 is reduced. As a result, the height of the off-axis ray that passes through the first lens unit U1 is increased, to thereby increase the size of the lens. On the other hand, if f1/fw in the conditional expression (17) exceeds a lower limit, the refractive power of the first lens unit U1 is increased. In particular, it becomes difficult to correct the chromatic aberration and the various aberrations at the telephoto end.

It is more preferred to set the numerical value range of the conditional expression (17) as follows.

$$2.00 < f1/fw < 3.30 \quad (17a)$$

In addition, it is more preferred that the zoom lens of each of the embodiments satisfy the following conditional expression:

$$-2.7 < \beta nw < -1.0 \quad (18)$$

where βnw represents the lateral magnification at the wide angle end of the N-th lens unit UN when the axial ray enters from infinity in a state of focusing on infinity.

The conditional expression (18) defines the lateral magnification of the N-th lens unit UN. In the zoom lens of each of the embodiments, in order to suppress the influence of the increase in size and the manufacturing error of the lens on the optical performance, the lateral magnification of the N-th lens unit UN is appropriately set. By satisfying the conditional expression (18), the zoom lens that is superior in the manufacturability can be obtained while the increase in size of the lens is suppressed.

If βnw in the conditional expression (18) exceeds an upper limit, this leads to the increase in size of the lenses arranged before the N-th lens unit UN, and especially, the effective diameter of the first lens unit U1 is increased. On the other hand, if βnw in the conditional expression (18) exceeds a lower limit, the enlargement ratios of the lenses arranged before the N-th lens unit UN are increased, and hence it becomes difficult to correct various aberrations, especially, the chromatic aberration on the telephoto side. In addition, the performance reduction due to manufacturing fluctuations becomes larger because a manufacturing error greatly affects the performance.

It is more preferred to set the numerical value range of the conditional expression (18) as follows.

$$-2.40 < \beta nw < -1.50 \quad (18a)$$

Next, features of a lens configuration of each embodiment are described.

In Embodiment 1, the first lens unit U1 corresponds to a first lens surface to a twenty-first lens surface. The second lens unit U2 corresponds to a twenty-second lens surface to a thirty-first lens surface. The third lens unit U3 corresponds to a thirty-second lens surface to a thirty-fourth lens surface. The fourth lens unit U4 corresponds to a thirty-sixth lens surface to a fifty-third lens surface.

During the zooming from the wide angle end to the telephoto end, when the second lens unit U2 linearly moves to the image side, the third lens unit U3 substantially reciprocates while drawing a convex locus on the object side.

As shown in Table 1 below, Numerical Embodiment 1 satisfies any of the conditional expressions (1) to (4) and (15) to (18). In addition, as shown in the numerical value data of Numerical Embodiments, Numerical Embodiment 1 also satisfies the conditional expressions (5) and (6). In addition, the third and fifth lenses counted from the object side to the image side of the second lens unit U2 are positive lenses each satisfying the conditional expression (7). With this configuration, the wide angle of field of photography (angle of field) of 81.65° at the wide angle end is attained at the high zoom ratio of 10.00. Moreover, the high optical performance with which the various aberrations are satisfactorily corrected in the entire zoom range is obtained.

In Embodiment 2, the first lens unit U1 corresponds to a first lens surface to an eighteenth lens surface. The second lens unit U2 corresponds to a nineteenth lens surface to a twenty-fifth lens surface. The third lens unit U3 corresponds to a twenty-sixth lens surface to a twenty-eighth lens surface. The fourth lens unit U4 corresponds to a thirtieth lens surface to a forty-eighth lens surface.

During the zooming from the wide angle end to the telephoto end, when the second lens unit U2 linearly moves to the image side, the third lens unit U3 substantially reciprocates while drawing a convex locus on the object side.

As shown in Table 1 below, Numerical Embodiment 2 satisfies any of the conditional expressions (1) to (4) and (15) to (18). In addition, as shown in the numerical value data of Numerical Embodiments, Numerical Embodiment 2 also satisfies the conditional expressions (5) and (6). In addition, the third lens counted from the object side to the image side of the second lens unit U2 is a positive lens satisfying the conditional expression (7). With this configuration, the wide angle of field of photography (angle of field) of 92.06° at the wide angle end is attained at the high zoom ratio of 5.00. Moreover, the high optical performance with which the various aberrations are satisfactorily corrected in the entire zoom range is obtained.

In Embodiment 3, the first lens unit U1 corresponds to a first lens surface to an eighteenth lens surface. The second lens unit U2 corresponds to a nineteenth lens surface to a twenty-seventh lens surface. The third lens unit U3 corresponds to a twenty-eighth lens surface to a thirtieth lens surface. The fourth lens unit U4 corresponds to a thirty-second lens surface to a fifty-first lens surface.

During the zooming from the wide angle end to the telephoto end, when the second lens unit U2 linearly moves to the image side, the third lens unit U3 substantially reciprocates while drawing a convex locus on the object side.

As shown in Table 1 below, Numerical Embodiment 3 satisfies any of the conditional expressions (1) to (4) and (15) to (18). In addition, as shown in the numerical value data of Numerical Embodiments, Numerical Embodiment 3 also satisfies the conditional expressions (5) and (6). In addition, the second and fifth lenses counted from the object side to the image side of the second lens unit U2 are positive lenses each satisfying the conditional expression (7). With this configuration, the wide angle of field of photography (angle of field) of 75.73° at the wide angle end is attained at the high zoom ratio of 8.00. Moreover, the high optical performance with which the various aberrations are satisfactorily corrected in the entire zoom range is obtained.

In Embodiment 4, the first lens unit U1 corresponds to a first lens surface to a fifteenth lens surface. The second lens unit U2 corresponds to a sixteenth lens surface to a twenty-third lens surface. The third lens unit U3 corresponds to a twenty-fourth lens surface to a twenty-sixth lens surface. The fourth lens unit U4 corresponds to a twenty-eighth lens surface to a forty-fifth lens surface.

During the zooming from the wide angle end to the telephoto end, when the second lens unit U2 linearly moves to the image side, the third lens unit U3 substantially reciprocates while drawing a convex locus on the object side.

As shown in Table 1 below, Numerical Embodiment 4 satisfies any of the conditional expressions (1) to (4) and (15) to (18). In addition, as shown in the numerical value data of Numerical Embodiments, Numerical Embodiment 4 also satisfies the conditional expressions (5) and (6). In addition, the third lens counted from the object side to the image side of the second lens unit U2 is a positive lens satisfying the conditional expression (7). With this configuration, the wide angle of field of photography (angle of field) of 78.60° at the wide angle end is attained at the high zoom ratio of 5.00. Moreover, the high optical performance with which the various aberrations are satisfactorily corrected in the entire zoom range is obtained.

In Embodiment 5, the first lens unit U1 corresponds to a first lens surface to a nineteenth lens surface. The second lens unit U2 corresponds to a twentieth lens surface to a twenty-seventh lens surface. The third lens unit U3 corresponds to a twenty-eighth lens surface to a thirtieth lens surface. The fourth lens unit U4 corresponds to a thirty-second lens surface to a forty-eighth lens surface.

During the zooming from the wide angle end to the telephoto end, when the second lens unit U2 linearly moves to the image side, the third lens unit U3 substantially reciprocates while drawing a convex locus on the object side.

As shown in Table 1 below, Numerical Embodiment 5 satisfies any of the conditional expressions (1) to (4) and (15) to (18). In addition, as shown in the numerical value data of Numerical Embodiments, Numerical Embodiment 5 also satisfies the conditional expressions (5) and (6). In addition, the third lens counted from the object side to the image side of the second lens unit U2 is a positive lens satisfying the conditional expression (7). With this configuration, the wide angle of field of photography (angle of field) of 96.01° at the wide angle end is attained at the high zoom ratio of 4.00. Moreover, the high optical performance with which the various aberrations are satisfactorily corrected in the entire zoom range is obtained.

In Embodiment 6, the first lens unit U1 corresponds to a first lens surface to an eleventh lens surface. The second lens unit U2 corresponds to a twelfth lens surface to a twentieth lens surface. The third lens unit U3 corresponds to a twenty-first lens surface to a twenty-third lens surface. The fourth lens unit U4 corresponds to a twenty-fifth lens surface to a forty-first lens surface. The forty-second lens surface to the forty-fourth lens surface correspond to the glass block that imitates the optical filter or the color separation optical system of the camera.

During the zooming from the wide angle end to the telephoto end, when the second lens unit U2 linearly moves to the image side, the third lens unit U3 substantially reciprocates while drawing a convex locus on the object side.

As shown in Table 1 below, Numerical Embodiment 6 satisfies any of the conditional expressions (1) to (4), (15), (17), and (18). In addition, as shown in the numerical value data of Numerical Embodiments, Numerical Embodiment 6 also satisfies the conditional expressions (5) and (6). In addition, the fourth lens counted from the object side to the image side of the second lens unit U2 is a positive lens satisfying the conditional expression (7). With this configuration, the wide angle of field of photography (angle of field) of 69.02° at the wide angle end is attained at the high zoom ratio of 15.00. Moreover, the high optical performance with which the various aberrations are satisfactorily corrected in the entire zoom range is obtained.

In Embodiment 7, the first lens unit U1 corresponds to a first lens surface to a twenty-first lens surface. The second lens unit U2 corresponds to a twenty-second lens surface to a twenty-sixth lens surface. The third lens unit U3 corresponds to a twenty-seventh lens surface to a thirtieth lens surface. The fourth lens unit U4 corresponds to a thirty-first lens surface to a thirty-third lens surface. The fifth lens unit U5 corresponds to a thirty-fifth lens surface to a fifty-second lens surface.

During the zooming from the wide angle end to the telephoto end, when the second lens unit U2 linearly moves to the image side, the third lens unit U3 also moves substantially linearly to the image side. The second lens unit U2 and the third lens unit U3 move in such a direction that an interval between the second lens unit U2 and the third lens unit U3 increases during the zooming from the wide angle end to the telephoto end. In addition, the fourth lens unit U4 substantially reciprocates while drawing a convex locus on the object side.

As shown in Table 1 below, Numerical Embodiment 7 satisfies any of the conditional expressions (1) to (4) and (7) to (18). In addition, as shown in the numerical value data of Numerical Embodiments, Numerical Embodiment 7 also satisfies the conditional expressions (5), (6), (12), and (13). In addition, the second lens counted from the object side to the image side of the second lens unit U2 is a positive lens satisfying the conditional expressions (7) and (14). Further, the second lens counted from the object side to the image side of the third lens unit U3 is a positive lens satisfying the conditional expression (14). With this configuration, the wide angle of field of photography (angle of field) of 80.10° at the wide angle end is attained at the high zoom ratio of 6.50. Moreover, the high optical performance with which the various aberrations are satisfactorily corrected in the entire zoom range is obtained.

As described above, according to each embodiment, the refractive power arrangement of each lens unit, the movement locus of the moving lens unit for zooming, and the like are appropriately defined. Thus, it is possible to obtain the zoom lens having a higher zoom ratio and a wider angle of field, in which various aberrations are appropriately corrected.

FIG. 18 is a schematic diagram of a main part of an image pickup apparatus (TV camera system) employing the zoom lens of Embodiments 1 to 7 as an imaging optical system. FIG. 18 illustrates a zoom lens 101 according to any one of Embodiments 1 to 7 and a camera 124. The zoom lens 101 can be mounted into and removed from the camera 124. The zoom lens 101 is mounted into the camera 124 to form an image pickup apparatus 125. The zoom lens 101 includes a first lens unit F, a zoom section LZ, and an N-th lens unit R for image formation. The first lens unit F includes a focusing lens unit U12 that moves on the optical axis for focusing, and fixed lens units U11 and U13 that do not move during focusing.

The zoom section LZ includes the second and third lens units U2 and U3 that move on the optical axis for zooming according to Numerical Embodiments 1 to 6, and the second to fourth lens units U2 to U4 that move on the optical axis for zooming according to Numerical Embodiment 7. The zoom lens 101 also includes an aperture stop SP, and driving mechanisms 114 and 115, such as helicoids and cams, for driving the second sub-lens unit U12 and the zoom section LZ in the optical axis direction, respectively.

The image pickup apparatus 125 includes motors (driving units) 116 to 118 for electrically driving the driving mechanisms 114 and 115 and the aperture stop SP. The image pickup apparatus 125 also includes detectors 119 to 121, such as an encoder, a potentiometer, or a photo-sensor, which are configured to detect the positions of the second sub-lens unit U12 and the zoom section LZ on the optical axis, and the aperture diameter of the aperture stop SP. In addition, the camera 124 includes a glass block 109, which corresponds to an optical filter inside the camera 124. Further, the camera 124 includes a solid-state image pickup element (photoelectric conversion element) 110, such as a charge-coupled device (CCD) sensor or a complementary metal-oxide semiconductor (CMOS) sensor. The solid-state image pickup element 110 is configured to receive a subject image formed by the zoom lens 101.

Further, central processing units (CPUs) 111 and 122 control various types of driving of the camera 124 and the zoom lens 101, respectively. Through application of the zoom lens according to the present invention to a TV camera as described above, an image pickup apparatus having high optical performance is implemented.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

Now, Numerical Embodiments 1 to 7, corresponding to Embodiments 1 to 7 of the present invention, are described. In each of Numerical Embodiments, symbol i represents an order of a surface from the object side, symbol ri represents a curvature radius of an i-th surface from the object side, symbol di represents an interval between the i-th surface and the (i+1)th surface from the object side, and symbols ndi and vdi respectively represent a refractive index and an Abbe number of the i-th optical member. An aspherical surface is represented by "*" next to the surface number. Table 1 shows correspondences between each embodiment and the conditional expressions described above.

The aspherical shape is expressed by the following expression:

$$X = \frac{H^2/R}{1+\sqrt{1-(1+k)(H/R)^2}} + A4H^4 + A6H^6 + A8H^8 + A10H^{10} + A12H^{12} + A14H^{14} + A16H^{16}$$

where an X axis corresponds to the optical axis, an H axis corresponds to an axis perpendicular to the optical axis, a traveling direction of light corresponds to a positive direction, R represents a paraxial curvature radius, k represents a conic constant, A4, A6, A8, A10, A12, A14, and A16 each represent an aspherical coefficient, and "e-Z" means "×10$^{-z}$".

In each of Embodiments 1 to 6, two lens units move during the zooming, and hence when the movement locus of one lens unit is determined, the movement locus of the other lens unit is also determined. However, in Embodiment 7, three lens units move during the zooming, and hence even when the movement locus of one lens unit is determined, the movement loci of the other two lens units cannot be determined. Therefore, Embodiment 7 shows the movement loci of the second lens unit and the third lens unit.

The movement locus is expressed by the following expression:

$$fj(y) = Bj1y + Bj2y^2 + Bj3y^3 + Bj4y^4 + Bj5y^5 + Bj6y^6$$

where j represents a number of a lens unit, fj(y) represents a movement amount in the optical axis direction, a traveling direction of light corresponds to a positive direction, y represents the amount of movement from the wide angle end to the telephoto end as 1, and Bj1, Bj2, Bj3, Bj4, Bj5, and Bj6 each represent a movement coefficient.

Numerical Embodiment 1

Unit: mm

Surface data

| Surface number | r | d | nd | vd | θgF | Effective diameter | Focal length |
|---|---|---|---|---|---|---|---|
| 1* | 107.07477 | 3.50000 | 1.772499 | 49.60 | 0.5521 | 94.999 | −94.002 |
| 2 | 42.77453 | 29.44657 | | | | 74.747 | |
| 3 | −111.18408 | 2.00000 | 1.772499 | 49.60 | 0.5521 | 74.020 | −86.187 |
| 4 | 169.27879 | 0.19853 | | | | 73.831 | |
| 5 | 111.15261 | 6.53424 | 1.959060 | 17.47 | 0.6599 | 74.684 | 162.844 |
| 6 | 362.57244 | 4.83576 | | | | 74.310 | |
| 7* | 402.11683 | 9.52789 | 1.620411 | 60.29 | 0.5426 | 73.646 | 143.795 |
| 8 | −114.18218 | 7.22051 | | | | 73.330 | |
| 9 | 273.53589 | 11.14023 | 1.496999 | 81.54 | 0.5374 | 67.740 | 131.565 |
| 10 | −85.09102 | 1.32713 | | | | 67.551 | |
| 11 | −74.32274 | 2.00000 | 1.805181 | 25.42 | 0.6161 | 67.398 | −164.470 |
| 12 | −169.44313 | 1.00002 | | | | 68.351 | |
| 13 | 2516.57481 | 1.80000 | 1.850259 | 32.27 | 0.5929 | 68.012 | −98.133 |
| 14 | 81.30733 | 11.18444 | 1.438750 | 94.93 | 0.5343 | 67.555 | 149.790 |
| 15 | −332.76941 | 0.20010 | | | | 67.981 | |
| 16 | 7491.62170 | 5.08975 | 1.496999 | 81.54 | 0.5374 | 68.578 | 390.027 |
| 17 | −199.54524 | 0.20000 | | | | 69.118 | |
| 18 | 1595.58460 | 5.39098 | 1.595220 | 67.74 | 0.5442 | 69.947 | 305.715 |
| 19 | −205.94799 | 0.20000 | | | | 70.201 | |
| 20 | 216.17076 | 10.28079 | 1.730000 | 49.00 | 0.5575 | 70.182 | 104.355 |
| 21 | −116.13168 | (Variable) | | | | 69.897 | |
| 22* | 50.60782 | 1.00000 | 1.882997 | 40.76 | 0.5667 | 31.807 | −41.311 |
| 23 | 21.07209 | 6.61768 | | | | 27.724 | |
| 24 | −79.54129 | 1.00000 | 1.754998 | 52.32 | 0.5476 | 27.582 | −47.508 |
| 25 | 66.22881 | 0.99806 | | | | 26.863 | |
| 26 | 48.90892 | 4.02300 | 1.882210 | 23.78 | 0.6036 | 26.802 | 40.333 |
| 27 | −130.21404 | 1.94929 | | | | 26.376 | |
| 28 | −37.12529 | 1.00000 | 1.618000 | 63.33 | 0.5441 | 26.194 | −55.128 |
| 29 | 438.13751 | 0.20000 | | | | 25.725 | |
| 30 | 34.72260 | 1.88615 | 1.613397 | 44.30 | 0.5633 | 25.302 | 287.073 |
| 31 | 42.29949 | (Variable) | | | | 24.759 | |
| 32 | −46.20252 | 1.00000 | 1.696797 | 55.53 | 0.5433 | 22.167 | −45.199 |
| 33 | 101.17257 | 2.21450 | 1.808095 | 22.76 | 0.6307 | 23.128 | 112.579 |
| 34 | −994.45522 | (Variable) | | | | 23.547 | |
| 35 (Aperture stop) | ∞ | 1.29695 | | | | 28.883 | |
| 36 | 143.50842 | 4.48049 | 1.816000 | 46.62 | 0.5568 | 29.930 | 47.136 |
| 37 | −52.16988 | 0.20000 | | | | 30.182 | |
| 38 | 52.13637 | 6.23615 | 1.487490 | 70.23 | 0.5300 | 29.349 | 48.593 |
| 39 | −41.96851 | 1.20000 | 2.000690 | 25.46 | 0.6133 | 28.856 | −39.407 |
| 40 | 781.32347 | 0.19891 | | | | 28.725 | |
| 41 | 22.82507 | 9.56381 | 1.516330 | 64.14 | 0.5352 | 28.572 | 29.895 |
| 42 | −41.33452 | 1.00000 | 1.834000 | 37.16 | 0.5775 | 27.399 | −26.832 |
| 43 | 50.02430 | 6.99907 | | | | 25.923 | |
| 44 | 386.69864 | 3.99920 | 1.487490 | 70.23 | 0.5300 | 25.416 | 67.610 |
| 45 | −36.04126 | 1.08491 | | | | 25.291 | |
| 46 | 34.86509 | 4.96949 | 1.922860 | 20.88 | 0.6282 | 22.498 | 20.574 |
| 47 | −39.79509 | 0.90000 | 1.882997 | 40.76 | 0.5667 | 21.517 | −18.496 |
| 48 | 28.27246 | 8.88270 | | | | 18.955 | |
| 49 | 37.01797 | 4.62848 | 1.438750 | 94.93 | 0.5343 | 16.005 | 25.301 |
| 50 | −15.30482 | 1.00000 | 1.953750 | 32.32 | 0.5898 | 15.736 | −12.619 |
| 51 | 60.19086 | 2.75426 | | | | 16.455 | |
| 52 | 45.70173 | 3.00473 | 1.620411 | 60.29 | 0.5426 | 18.630 | 48.353 |
| 53 | −86.09140 | 50.07000 | | | | 18.983 | |
| Image surface | ∞ | | | | | | |

Aspherical surface data

First surface

K = 1.92497e+000    A4 = 1.92902e−009    A6 = 6.26259e−011    A8 = −9.53828e−014
A10 = 6.21216e−017   A12 = −2.17747e−020   A14 = 3.29927e−024   A16 = −2.10130e−028

-continued

| Unit: mm |
|---|

| Seventh surface |
|---|

K = −2.29488e+001  A4 = −4.72874e−007  A6 = 4.95024e−011  A8 = 4.20753e−014
A10 = −7.75550e−017  A12 = 9.10273e−020  A14 = −5.11370e−023  A16 = 1.17437e−026

| Twenty-second surface |
|---|

K = 5.48442e−001  A4 = 1.59884e−007  A6 = −3.77659e−009  A8 = 1.79255e−011
A10 = −4.48568e−014  A12 = −3.70888e−016  A14 = 2.09083e−018  A16 = −2.91328e−021

| Various data Zoom ratio 10.00 | | | |
|---|---|---|---|
| | Wide angle | Intermediate | Telephoto |
| Focal length | 18.00 | 63.00 | 180.00 |
| F number | 4.00 | 4.00 | 4.95 |
| Half angular field of view | 40.82 | 13.86 | 4.94 |
| Image height | 15.55 | 15.55 | 15.55 |
| Total lens length | 320.10 | 320.10 | 320.10 |
| BF | 50.07 | 50.07 | 50.07 |
| d21 | 0.70 | 45.74 | 65.06 |
| d31 | 60.47 | 8.62 | 6.48 |
| d34 | 11.50 | 18.30 | 1.12 |
| Entrance pupil position | 57.50 | 105.61 | 175.05 |
| Exit pupil position | −33.80 | −33.80 | −33.80 |
| Front principal point position | 71.63 | 121.28 | −31.27 |
| Rear principal point position | 32.07 | −12.93 | −129.93 |

| Zoom lens unit data | | | | | |
|---|---|---|---|---|---|
| Unit | Leading surface | Focal length | Lens structure length | Front principal point position | Rear principal point position |
| 1 | 1 | 57.00 | 113.08 | 71.51 | 43.38 |
| 2 | 22 | −26.70 | 18.67 | 3.98 | −9.70 |
| 3 | 32 | −76.10 | 3.21 | −0.16 | −1.98 |
| 4 | 35 | 31.05 | 62.40 | −11.09 | −41.97 |

Numerical Embodiment 2

| Unit: mm |
|---|

| Surface data | | | | | | | |
|---|---|---|---|---|---|---|---|
| Surface number | r | d | nd | vd | θgF | Effective diameter | Focal length |
| 1* | 86.96069 | 2.80000 | 1.772499 | 49.60 | 0.5521 | 99.506 | −85.846 |
| 2 | 37.19554 | 28.65314 | | | | 72.568 | |
| 3 | 287.18991 | 2.20000 | 1.772499 | 49.60 | 0.5521 | 71.378 | −151.018 |
| 4 | 82.96532 | 9.79457 | | | | 68.012 | |
| 5 | 233.30951 | 2.20000 | 1.772499 | 49.60 | 0.5521 | 67.303 | −81.001 |
| 6 | 49.32285 | 9.90654 | 1.922860 | 18.90 | 0.6495 | 64.827 | 83.114 |
| 7 | 122.07948 | 4.11145 | | | | 64.165 | |
| 8 | 174.57379 | 7.40358 | 1.496999 | 81.54 | 0.5374 | 63.832 | 170.294 |
| 9* | −162.88781 | 10.55549 | | | | 63.329 | |
| 10 | 219.22560 | 11.10101 | 1.618000 | 63.33 | 0.5441 | 61.797 | 87.081 |
| 11 | −70.29224 | 0.51997 | | | | 61.501 | |
| 12 | −90.66362 | 2.00000 | 1.805181 | 25.42 | 0.6161 | 58.344 | −51.316 |
| 13 | 77.98219 | 9.18481 | 1.496999 | 81.54 | 0.5374 | 56.765 | 117.857 |
| 14 | −228.82556 | 0.21692 | | | | 57.161 | |
| 15 | 229.51464 | 10.00000 | 1.595220 | 67.74 | 0.5442 | 57.792 | 89.884 |
| 16 | −68.94195 | 0.20000 | | | | 57.805 | |
| 17 | 57.54531 | 5.56934 | 1.730000 | 49.00 | 0.5575 | 50.901 | 114.868 |
| 18 | 174.06610 | (Variable) | | | | 50.045 | |
| 19* | 222.99988 | 1.30000 | 1.772499 | 49.60 | 0.5521 | 29.397 | −31.652 |
| 20 | 22.07423 | 8.73811 | | | | 24.622 | |

-continued

| | | | | | | | |
|---|---|---|---|---|---|---|---|
| 21 | −46.00024 | 0.90000 | 1.772499 | 49.60 | 0.5521 | 21.288 | −21.359 |
| 22 | 26.14240 | 4.04203 | 1.846660 | 23.78 | 0.6034 | 21.985 | 24.438 |
| 23 | −96.70044 | 2.91044 | | | | 22.088 | |
| 24 | −20.39226 | 0.90000 | 1.800999 | 34.97 | 0.5863 | 22.088 | −89.160 |
| 25 | −29.02640 | (Variable) | | | | 23.053 | |
| 26 | −33.53567 | 0.90000 | 1.729157 | 54.68 | 0.5444 | 23.727 | −29.601 |
| 27 | 62.00299 | 2.73134 | 1.846660 | 23.78 | 0.6205 | 25.908 | 73.336 |
| 28 | 5426.95120 | (Variable) | | | | 26.494 | |
| 29 (Aperture stop) | ∞ | 1.04258 | | | | 27.557 | |
| 30 | 144.60763 | 5.80564 | 1.834807 | 42.71 | 0.5642 | 29.049 | 38.100 |
| 31 | −40.31316 | 0.20000 | | | | 29.778 | |
| 32 | 140.01330 | 2.90947 | 1.570989 | 50.80 | 0.5588 | 29.573 | 116.796 |
| 33 | −127.51474 | 0.20000 | | | | 29.431 | |
| 34 | 62.82013 | 7.44444 | 1.496999 | 81.54 | 0.5374 | 28.583 | 43.611 |
| 35 | −31.93064 | 1.20000 | 2.000690 | 25.46 | 0.6133 | 27.614 | −30.706 |
| 36 | 1097.65571 | 0.20000 | | | | 27.561 | |
| 37 | 27.33320 | 3.43062 | 1.531717 | 48.84 | 0.5630 | 27.568 | 130.948 |
| 38 | 42.89669 | 17.98679 | | | | 26.842 | |
| 39 | −77.25420 | 4.44564 | 1.487490 | 70.23 | 0.5300 | 23.060 | 306.323 |
| 40 | −51.93660 | 20.78154 | | | | 22.786 | |
| 41 | 72.70188 | 7.72582 | 1.487490 | 70.23 | 0.5300 | 25.172 | 30.867 |
| 42 | −18.39119 | 0.85000 | 1.953750 | 32.32 | 0.5898 | 25.094 | −21.994 |
| 43 | −145.10189 | 2.61020 | | | | 27.091 | |
| 44 | 837.85153 | 6.19253 | 2.102050 | 16.77 | 0.6721 | 29.071 | 32.378 |
| 45 | −37.66305 | 0.85000 | 2.000690 | 25.46 | 0.6133 | 29.817 | −29.178 |
| 46 | 136.96902 | 0.19086 | | | | 30.863 | |
| 47 | 42.04543 | 7.61002 | 1.487490 | 70.23 | 0.5300 | 32.756 | 52.334 |
| 48 | −61.55333 | 33.54000 | | | | 33.050 | |
| Image surface | ∞ | | | | | | |

Aspherical surface data

First surface

K = 1.16599e+000   A4 = 2.14949e−007   A6 = −3.88534e−011   A8 = 1.50332e−014

Ninth surface

K = −9.49193e+000   A4 = 5.68085e−007   A6 = 2.51185e−010   A8 = 5.19688e−014

Nineteenth surface

K = −4.37435e+002   A4 = 1.00143e−005   A6 = −1.61464e−008   A8 = 2.99969e−011

Various data
Zoom ratio 5.00

| | Wide angle | Intermediate | Telephoto |
|---|---|---|---|
| Focal length | 15.00 | 35.00 | 75.00 |
| F number | 3.00 | 3.00 | 3.00 |
| Half angular field of view | 46.03 | 23.96 | 11.71 |
| Image height | 15.55 | 15.55 | 15.55 |
| Total lens length | 300.20 | 300.20 | 300.20 |
| BF | 33.54 | 33.54 | 33.54 |
| d18 | 0.99 | 21.34 | 32.89 |
| d25 | 32.46 | 9.59 | 1.98 |
| d28 | 2.70 | 5.23 | 1.28 |
| Entrance pupil position | 50.74 | 66.16 | 86.04 |
| Exit pupil position | −158.40 | −158.40 | −158.40 |
| Front principal point position | 64.57 | 94.78 | 131.73 |
| Rear principal point position | 18.54 | −1.46 | −41.46 |

Zoom lens unit data

| Unit | Leading surface | Focal length | Lens structure length | Front principal point position | Rear principal point position |
|---|---|---|---|---|---|
| 1 | 1 | 32.00 | 116.42 | 59.75 | 30.90 |
| 2 | 19 | −18.80 | 18.79 | 3.92 | −10.58 |

-continued

| | | | | | |
|---|---|---|---|---|---|
| 3 | 26 | −50.00 | 3.63 | −0.04 | −2.03 |
| 4 | 29 | 40.41 | 91.68 | 23.49 | −102.31 |

Numerical Embodiment 3

| Unit: mm |
|---|

| Surface data |
|---|

| Surface number | r | d | nd | vd | θgF | Effective diameter | Focal length |
|---|---|---|---|---|---|---|---|
| 1 | 1464.37780 | 3.20000 | 1.772499 | 49.60 | 0.5521 | 96.525 | −86.352 |
| 2 | 64.03231 | 23.73215 | | | | 82.301 | |
| 3 | −120.19877 | 2.70000 | 1.772499 | 49.60 | 0.5521 | 81.903 | −157.539 |
| 4 | −7122.29818 | 0.19535 | | | | 83.622 | |
| 5 | 135.38385 | 5.79104 | 1.922860 | 20.88 | 0.6282 | 85.855 | 267.092 |
| 6 | 290.21299 | 1.99903 | | | | 85.522 | |
| 7 | 251.24989 | 14.76690 | 1.620411 | 60.29 | 0.5426 | 85.401 | 125.798 |
| 8* | −111.29663 | 0.19558 | | | | 84.900 | |
| 9 | 15648.74980 | 11.63370 | 1.496999 | 81.54 | 0.5374 | 79.023 | 170.753 |
| 10 | −85.55687 | 2.50000 | 1.800000 | 29.84 | 0.6017 | 78.575 | −158.224 |
| 11 | −263.13162 | 7.30434 | | | | 78.571 | |
| 12 | 122.72575 | 2.50000 | 1.737999 | 32.26 | 0.5899 | 76.826 | −152.090 |
| 13 | 58.33771 | 17.98321 | 1.496999 | 81.54 | 0.5374 | 74.254 | 99.970 |
| 14 | −306.67066 | 0.20000 | | | | 74.127 | |
| 15 | 103.17491 | 9.28268 | 1.537150 | 74.81 | 0.5390 | 72.301 | 169.230 |
| 16 | −760.39964 | 0.20000 | | | | 71.562 | |
| 17 | 86.72637 | 6.50027 | 1.790000 | 45.50 | 0.5720 | 66.388 | 174.512 |
| 18 | 224.07742 | (Variable) | | | | 64.720 | |
| 19* | 74.69742 | 1.20000 | 1.882997 | 40.76 | 0.5667 | 31.251 | −28.364 |
| 20 | 18.69569 | 4.61081 | | | | 25.802 | |
| 21 | 111.19420 | 6.40794 | 1.846660 | 23.78 | 0.6034 | 25.666 | 21.564 |
| 22 | −21.51662 | 0.70000 | 1.882997 | 40.76 | 0.5667 | 24.826 | −21.788 |
| 23 | 195.15304 | 3.40085 | | | | 22.613 | |
| 24 | −23.61290 | 0.70000 | 1.531717 | 48.84 | 0.5630 | 22.613 | −35.863 |
| 25 | 102.69381 | 0.16000 | | | | 24.460 | |
| 26 | 51.03251 | 3.67799 | 1.613397 | 44.30 | 0.5633 | 25.331 | 56.753 |
| 27 | −108.33345 | (Variable) | | | | 25.686 | |
| 28 | −33.59267 | 0.90000 | 1.651597 | 58.55 | 0.5426 | 26.194 | −41.043 |
| 29 | 135.24634 | 2.33683 | 1.808095 | 22.76 | 0.6307 | 28.358 | 123.681 |
| 30 | −395.42324 | (Variable) | | | | 28.934 | |
| 31 (Aperture stop) | ∞ | 1.29353 | | | | 35.132 | |
| 32 | 1023.63042 | 4.51438 | 1.754998 | 52.32 | 0.5476 | 36.234 | 72.802 |
| 33 | −58.25333 | 0.20000 | | | | 36.777 | |
| 34 | 68.98860 | 5.01187 | 1.618000 | 63.33 | 0.5441 | 37.923 | 83.414 |
| 35 | −201.24720 | 0.20000 | | | | 37.777 | |
| 36 | 57.87442 | 5.13367 | 1.496999 | 81.54 | 0.5374 | 36.631 | 95.079 |
| 37 | −253.95832 | 1.20000 | 2.001000 | 29.13 | 0.5997 | 36.011 | −95.535 |
| 38 | 155.76709 | 0.19935 | | | | 35.264 | |
| 39 | 43.83937 | 10.52855 | 1.516330 | 64.14 | 0.5352 | 34.451 | 47.261 |
| 40 | −50.95133 | 1.10000 | 1.772499 | 49.60 | 0.5521 | 32.346 | −41.715 |
| 41 | 89.67330 | 22.97015 | | | | 30.835 | |
| 42 | 50.15394 | 4.85521 | 1.487490 | 70.23 | 0.5300 | 24.993 | 49.076 |
| 43 | −44.57995 | 0.24116 | | | | 24.899 | |
| 44 | 28.14197 | 5.77865 | 1.487490 | 70.23 | 0.5300 | 23.118 | 33.581 |
| 45 | −36.79546 | 1.00000 | 2.000690 | 25.46 | 0.6133 | 22.243 | −15.155 |
| 46 | 26.56639 | 2.41025 | | | | 21.159 | |
| 47 | 180.15182 | 7.09223 | 1.808095 | 22.76 | 0.6307 | 21.404 | 18.393 |
| 48 | −16.09271 | 1.00000 | 1.882997 | 40.76 | 0.5667 | 21.883 | −16.763 |
| 49 | 204.71944 | 6.09212 | | | | 23.295 | |
| 50 | 34.10624 | 4.80075 | 1.487490 | 70.23 | 0.5300 | 28.643 | 66.313 |
| 51 | −632.14267 | 37.88000 | | | | 28.727 | |
| Image surface | ∞ | | | | | | |

| Aspherical surface data |
|---|

| Eighth surface |
|---|

K = 7.64826e−001  A4 = 2.02728e−007  A6 = 5.93168e−011  A8 = −1.76160e−013
A10 = 2.73743e−016  A12 = −2.26960e−019  A14 = 9.46924e−023  A16 = −1.56898e−026

-continued

| Unit: mm |
|---|

| Nineteenth surface |
|---|

K = 1.02944e+000   A4 = 4.84636e−006   A6 = −9.64701e−009   A8 = 5.80327e−011
A10 = −3.77375e−013   A12 = 1.18904e−015   A14 = −9.44522e−019   A16 = −1.67064e−021

| Various data Zoom ratio 8.00 | | | |
|---|---|---|---|
| | Wide angle | Intermediate | Telephoto |
| Focal length | 20.00 | 60.00 | 160.00 |
| F number | 2.80 | 2.80 | 3.60 |
| Half angular field of view | 37.87 | 14.53 | 5.55 |
| Image height | 15.55 | 15.55 | 15.55 |
| Total lens length | 310.06 | 310.06 | 310.06 |
| BF | 37.88 | 37.88 | 37.88 |
| d18 | 0.69 | 30.37 | 44.35 |
| d27 | 41.68 | 8.49 | 6.50 |
| d30 | 9.40 | 12.91 | 0.93 |
| Entrance pupil position | 60.15 | 110.86 | 190.18 |
| Exit pupil position | −75.15 | −75.15 | −75.15 |
| Front principal point position | 76.61 | 139.01 | 123.71 |
| Rear principal point position | 17.88 | −22.12 | −122.12 |

| Zoom lens unit data | | | | | |
|---|---|---|---|---|---|
| Unit | Leading surface | Focal length | Lens structure length | Front principal point position | Rear principal point position |
| 1 | 1 | 52.10 | 110.68 | 61.22 | 20.90 |
| 2 | 19 | −21.50 | 20.86 | 3.10 | −11.59 |
| 3 | 28 | −62.00 | 3.24 | −0.27 | −2.11 |
| 4 | 31 | 35.32 | 85.62 | 5.69 | −68.37 |

Numerical Embodiment 4

| Unit: mm |
|---|

| Surface data | | | | | | | |
|---|---|---|---|---|---|---|---|
| Surface number | r | d | nd | vd | θgF | Effective diameter | Focal length |
| 1 | 131.14622 | 3.00000 | 1.772499 | 49.60 | 0.5521 | 90.070 | −91.906 |
| 2 | 45.74280 | 23.07058 | | | | 73.485 | |
| 3 | −190.51759 | 2.50000 | 1.754998 | 52.32 | 0.5476 | 73.046 | −92.545 |
| 4 | 111.76131 | 2.70555 | | | | 72.305 | |
| 5 | 102.35624 | 6.78100 | 1.922860 | 20.88 | 0.6282 | 73.869 | 158.066 |
| 6 | 323.65984 | 2.07854 | | | | 73.551 | |
| 7* | 198.12409 | 7.52728 | 1.620411 | 60.29 | 0.5426 | 73.308 | 200.459 |
| 8 | −332.71985 | 10.42728 | | | | 72.900 | |
| 9 | 105.74456 | 10.78155 | 1.595220 | 67.74 | 0.5442 | 72.731 | 130.062 |
| 10 | −281.63972 | 0.20000 | | | | 72.228 | |
| 11 | 125.39952 | 2.00000 | 1.882210 | 23.78 | 0.6036 | 68.470 | −90.324 |
| 12 | 48.64939 | 16.97372 | 1.438750 | 94.93 | 0.5343 | 64.323 | 93.643 |
| 13 | −239.97566 | 0.20000 | | | | 64.141 | |
| 14 | 84.45216 | 10.77658 | 1.772499 | 49.60 | 0.5521 | 62.316 | 78.504 |
| 15 | −206.62606 | (Variable) | | | | 61.136 | |
| 16* | 48.27098 | 1.20000 | 2.001000 | 29.13 | 0.5997 | 30.013 | −27.936 |
| 17 | 17.57501 | 7.48668 | | | | 24.778 | |
| 18 | −36.17012 | 0.80000 | 1.816000 | 46.62 | 0.5568 | 24.550 | −28.913 |
| 19 | 69.54013 | 0.49278 | | | | 24.066 | |
| 20 | 43.80124 | 4.88511 | 2.000690 | 25.46 | 0.6133 | 24.142 | 21.424 |
| 21 | −40.36572 | 1.36383 | | | | 23.790 | |
| 22 | −25.24489 | 0.90000 | 1.834807 | 42.71 | 0.5642 | 23.574 | −52.907 |

-continued

| | | | Unit: mm | | | | |
|---|---|---|---|---|---|---|---|
| 23 | −59.44507 | (Variable) | | | | 24.246 | |
| 24 | −27.96339 | 0.80000 | 1.639999 | 60.08 | 0.5370 | 24.628 | −34.341 |
| 25 | 105.79038 | 2.64502 | 1.808095 | 22.76 | 0.6307 | 26.665 | 93.540 |
| 26 | −271.51570 | (Variable) | | | | 27.221 | |
| 27 (Aperture stop) | ∞ | 1.47466 | | | | 28.069 | |
| 28 | −9897.87302 | 3.30206 | 1.772499 | 49.60 | 0.5521 | 28.982 | 78.066 |
| 29 | −60.23523 | 0.20000 | | | | 29.488 | |
| 30 | 192.97751 | 3.93909 | 1.589130 | 61.14 | 0.5406 | 30.056 | 79.968 |
| 31 | −62.17424 | 0.20000 | | | | 30.172 | |
| 32 | 69.45008 | 5.69407 | 1.516330 | 64.14 | 0.5352 | 29.533 | 52.091 |
| 33 | −42.92720 | 1.20000 | 2.000690 | 25.46 | 0.6133 | 29.123 | −41.036 |
| 34 | 1216.75385 | 0.19979 | | | | 29.063 | |
| 35 | 25.32639 | 3.68828 | 1.516330 | 64.14 | 0.5352 | 29.028 | 132.828 |
| 36 | 38.07596 | 18.18838 | | | | 28.193 | |
| 37 | 63.74293 | 0.90000 | 1.953750 | 32.32 | 0.5898 | 23.376 | −27.840 |
| 38 | 18.71075 | 5.95175 | 1.808095 | 22.76 | 0.6307 | 22.225 | 18.964 |
| 39 | −76.92161 | 1.38274 | | | | 21.851 | |
| 40 | 76.61712 | 4.87566 | 1.438750 | 94.93 | 0.5343 | 21.406 | 42.347 |
| 41 | −24.13109 | 1.00000 | 1.805181 | 25.42 | 0.6161 | 21.080 | −17.668 |
| 42 | 36.10887 | 11.09401 | | | | 21.337 | |
| 43 | 41.85392 | 7.51316 | 1.595220 | 67.74 | 0.5442 | 29.338 | 35.307 |
| 44 | −39.65572 | 1.20000 | 1.882997 | 40.76 | 0.5667 | 29.517 | −92.149 |
| 45 | −78.02765 | 39.99000 | | | | 30.027 | |
| Image surface | ∞ | | | | | | |

Aspherical surface data

Seventh surface

K = −1.73761e+001　　A4 = −3.20828e−007　　A6 = 3.77274e−011　　A8 = −1.60630e−014
A10 = −4.63233e−017　　A12 = 1.16115e−019　　A14 = −8.89475e−023　　A16 = 2.36508e−026

Sixteenth surface

K = −9.35949e+000　　A4 = 1.47026e−005　　A6 = −1.49210e−008　　A8 = 2.40783e−011
A10 = −3.38433e−014　　A12 = 1.88004e−015　　A14 = −1.26872e−017　　A16 = 2.79931e−020

Various data
Zoom ratio 5.00

| | Wide angle | Intermediate | Telephoto |
|---|---|---|---|
| Focal length | 19.00 | 45.00 | 95.00 |
| F number | 2.70 | 2.70 | 2.70 |
| Half angular field of view | 39.30 | 19.06 | 9.30 |
| Image height | 15.55 | 15.55 | 15.55 |
| Total lens length | 271.52 | 271.52 | 271.52 |
| BF | 39.99 | 39.99 | 39.99 |
| d15 | 0.70 | 22.76 | 34.43 |
| d23 | 29.03 | 6.96 | 4.48 |
| d26 | 10.20 | 10.21 | 1.02 |
| Entrance pupil position | 56.43 | 86.13 | 122.86 |
| Exit pupil position | −101.34 | −101.34 | −101.34 |
| Front principal point position | 72.88 | 116.80 | 154.00 |
| Rear principal point position | 20.99 | −5.01 | −55.01 |

Zoom lens unit data

| Unit | Leading surface | Focal length | Lens structure length | Front principal point position | Rear principal point position |
|---|---|---|---|---|---|
| 1 | 1 | 45.00 | 99.02 | 57.71 | 19.90 |
| 2 | 16 | −24.80 | 17.13 | 1.21 | −12.13 |
| 3 | 24 | −55.00 | 3.45 | −0.37 | −2.32 |
| 4 | 27 | 39.90 | 72.00 | 19.18 | −64.39 |

Numerical Embodiment 5

| | | | Unit: mm | | | | |
|---|---|---|---|---|---|---|---|
| | | | Surface data | | | | |
| Surface number | r | d | nd | vd | θgF | Effective diameter | Focal length |
| 1* | 81.52156 | 2.80000 | 1.772499 | 49.60 | 0.5521 | 97.279 | −83.251 |
| 2 | 35.50574 | 31.30681 | | | | 70.026 | |
| 3 | 667.71915 | 2.20000 | 1.772499 | 49.60 | 0.5521 | 68.022 | −135.261 |
| 4 | 90.59457 | 4.47839 | | | | 64.610 | |
| 5 | 197.06072 | 2.20000 | 1.834807 | 42.71 | 0.5642 | 64.321 | −66.614 |
| 6 | 43.33682 | 11.33919 | 1.922860 | 18.90 | 0.6495 | 60.874 | 69.654 |
| 7 | 113.32971 | 2.55719 | | | | 59.842 | |
| 8 | 115.11681 | 9.51685 | 1.496999 | 81.54 | 0.5374 | 59.385 | 153.156 |
| 9* | −220.41107 | 0.20000 | | | | 58.068 | |
| 10 | 185.45912 | 9.63439 | 1.618000 | 63.33 | 0.5441 | 57.517 | 91.373 |
| 11 | −80.00592 | 2.00000 | 1.846660 | 23.78 | 0.6205 | 57.026 | −103.318 |
| 12 | −857.68120 | 5.60166 | | | | 56.350 | |
| 13 | −547.42488 | 2.00000 | 1.846660 | 23.78 | 0.6205 | 55.107 | −95.810 |
| 14 | 96.50030 | 8.54469 | 1.496999 | 81.54 | 0.5374 | 56.048 | 126.294 |
| 15 | −175.74550 | 0.20000 | | | | 56.723 | |
| 16 | 248.42762 | 12.85098 | 1.595220 | 67.74 | 0.5442 | 58.081 | 80.834 |
| 17 | −58.77230 | 0.20000 | | | | 58.452 | |
| 18 | 56.55329 | 6.43207 | 1.763850 | 48.51 | 0.5587 | 50.476 | 91.827 |
| 19 | 271.97337 | (Variable) | | | | 49.270 | |
| 20* | 75.52289 | 1.30000 | 1.816000 | 46.62 | 0.5568 | 27.970 | −25.770 |
| 21 | 16.38581 | 7.94998 | | | | 22.551 | |
| 22 | −35.35061 | 0.90000 | 1.754998 | 52.32 | 0.5476 | 20.890 | −28.150 |
| 23 | 54.49701 | 0.20000 | | | | 20.318 | |
| 24 | 38.34698 | 4.04203 | 1.846660 | 23.78 | 0.6034 | 20.314 | 27.246 |
| 25 | −56.47379 | 2.18661 | | | | 19.859 | |
| 26 | −20.15327 | 0.90000 | 1.882997 | 40.76 | 0.5667 | 19.635 | −76.243 |
| 27 | −29.29552 | (Variable) | | | | 20.447 | |
| 28 | −28.24173 | 0.90000 | 1.729157 | 54.68 | 0.5444 | 21.748 | −31.883 |
| 29 | 136.58830 | 2.26264 | 1.846660 | 23.78 | 0.6205 | 23.610 | 90.643 |
| 30 | −177.80079 | (Variable) | | | | 24.238 | |
| 31 (Aperture stop) | ∞ | 1.80831 | | | | 26.366 | |
| 32 | 1876.46717 | 5.41221 | 1.816000 | 46.62 | 0.5568 | 27.823 | 37.988 |
| 33 | −31.64154 | 0.20000 | | | | 28.604 | |
| 34 | 60.10061 | 8.24256 | 1.496999 | 81.54 | 0.5374 | 28.186 | 38.709 |
| 35 | −27.12183 | 1.20000 | 2.001000 | 29.13 | 0.5997 | 27.594 | −34.449 |
| 36 | −126.12274 | 0.20000 | | | | 28.202 | |
| 37 | 27.44643 | 3.25073 | 1.612929 | 37.00 | 0.5862 | 28.528 | 139.096 |
| 38 | 38.53198 | 22.34855 | | | | 27.776 | |
| 39 | −524.12330 | 5.21590 | 1.517417 | 52.43 | 0.5564 | 24.011 | 121.284 |
| 40 | −56.46271 | 11.54753 | | | | 24.632 | |
| 41 | 111.79736 | 8.05123 | 1.496999 | 81.54 | 0.5374 | 24.704 | 33.474 |
| 42 | −19.14232 | 0.85000 | 1.953750 | 32.31 | 0.5898 | 24.498 | −25.679 |
| 43 | −87.28015 | 3.16563 | | | | 25.890 | |
| 44 | 436.69471 | 5.32440 | 1.959060 | 17.47 | 0.6599 | 27.387 | 38.954 |
| 45 | −41.20307 | 0.85000 | 2.001000 | 29.13 | 0.5997 | 27.768 | −24.479 |
| 46 | 62.31899 | 0.38161 | | | | 28.514 | |
| 47 | 43.43683 | 7.60385 | 1.496999 | 81.54 | 0.5374 | 29.721 | 43.773 |
| 48 | −41.28677 | 41.02000 | | | | 30.288 | |
| Image surface | ∞ | | | | | | |

Aspherical surface data

First surface $K = 1.15930e+000$    $A4 = 3.25637e-007$    $A6 = -7.92964e-012$    $A8 = 8.93227e-015$ Ninth surface $K = -4.96791e+001$    $A4 = 8.83515e-007$    $A6 = 5.16367e-010$    $A8 = 5.70862e-014$ Twentieth surface $K = 8.19089e+000$    $A4 = 5.61681e-006$    $A6 = -9.29022e-009$    $A8 = 2.78530e-011$ -continued

| Unit: mm | | | |
|---|---|---|---|
| Various data Zoom ratio 4.00 | | | |
| | Wide angle | Intermediate | Telephoto |
| Focal length | 14.00 | 28.00 | 56.00 |
| F number | 3.00 | 3.00 | 3.00 |
| Half angular field of view | 48.00 | 29.05 | 15.52 |
| Image height | 15.55 | 15.55 | 15.55 |
| Total lens length | 297.27 | 297.27 | 297.27 |
| BF | 41.02 | 41.02 | 41.02 |
| d19 | 1.00 | 17.72 | 28.94 |
| d27 | 32.19 | 13.50 | 4.68 |
| d30 | 2.70 | 4.67 | 2.27 |
| Entrance pupil position | 48.68 | 60.09 | 76.35 |
| Exit pupil position | −122.20 | −122.20 | −122.20 |
| Front principal point position | 61.48 | 83.29 | 113.13 |
| Rear principal point position | 27.02 | 13.02 | −14.98 |

| Zoom lens unit data | | | | | |
|---|---|---|---|---|---|
| Unit | Leading surface | Focal length | Lens structure length | Front principal point position | Rear principal point position |
| 1 | 1 | 30.00 | 114.06 | 57.47 | 29.47 |
| 2 | 20 | −19.00 | 17.48 | 2.47 | −11.25 |
| 3 | 28 | −50.00 | 3.16 | −0.44 | −2.20 |
| 4 | 31 | 37.44 | 85.65 | 20.00 | −79.28 |

Numerical Embodiment 6

| Unit: mm | | | | | | |
|---|---|---|---|---|---|---|
| Surface data | | | | | | |
| Surface number | r | d | nd | vd | θgF | Effective diameter | Focal length |
| 1 | −327.39176 | 2.20000 | 1.800999 | 34.97 | 0.5863 | 77.240 | −159.412 |
| 2 | 212.30166 | 6.16736 | | | | 73.645 | |
| 3 | 13317.83260 | 2.20000 | 1.846660 | 23.78 | 0.6036 | 71.962 | −133.000 |
| 4 | 112.75087 | 10.43625 | 1.438750 | 94.93 | 0.5343 | 69.683 | 162.621 |
| 5 | −190.12082 | 0.15000 | | | | 69.612 | |
| 6 | 202.12097 | 8.24880 | 1.433870 | 95.10 | 0.5373 | 69.749 | 216.786 |
| 7 | −174.56398 | 5.52252 | | | | 69.593 | |
| 8 | 130.72546 | 7.75647 | 1.729157 | 54.68 | 0.5444 | 66.803 | 122.285 |
| 9 | −277.21316 | 0.15000 | | | | 66.223 | |
| 10 | 51.26048 | 5.75366 | 1.816000 | 46.62 | 0.5568 | 55.986 | 117.969 |
| 11 | 103.50442 | (Variable) | | | | 54.733 | |
| 12 | 40.30167 | 1.00000 | 1.882997 | 40.76 | 0.5667 | 27.162 | −25.624 |
| 13 | 14.37480 | 6.64137 | | | | 21.653 | |
| 14 | −44.26823 | 4.12247 | 1.959060 | 17.47 | 0.6599 | 21.201 | 27.280 |
| 15 | −17.34279 | 0.75000 | 1.882997 | 40.76 | 0.5667 | 20.813 | −12.721 |
| 16 | 33.07750 | 0.30000 | | | | 19.209 | |
| 17 | 23.07848 | 5.06268 | 1.613397 | 44.30 | 0.5633 | 19.205 | 22.525 |
| 18 | −31.97426 | 1.00000 | | | | 18.664 | |
| 19 | −20.45576 | 0.75000 | 1.743198 | 49.34 | 0.5530 | 18.441 | −37.760 |
| 20 | −75.66571 | (Variable) | | | | 18.299 | |
| 21 | −21.28881 | 0.75000 | 1.754998 | 52.32 | 0.5476 | 15.961 | −16.353 |
| 22 | 30.16460 | 3.20766 | 1.846490 | 23.90 | 0.6217 | 17.695 | 36.371 |

-continued

| | | | Unit: mm | | | | |
|---|---|---|---|---|---|---|---|
| 23 | 962.85645 | (Variable) | | | | 18.492 | |
| 24 (Aperture stop) | ∞ | 1.33800 | | | | 22.519 | |
| 25 | −513.75388 | 4.44000 | 1.670029 | 47.23 | 0.5627 | 23.522 | 46.335 |
| 26 | −29.51785 | 0.15000 | | | | 24.469 | |
| 27 | 42.71785 | 3.88000 | 1.487490 | 70.23 | 0.5300 | 25.553 | 98.440 |
| 28 | 367.25885 | 0.15000 | | | | 25.432 | |
| 29 | 76.36769 | 5.32854 | 1.501270 | 56.50 | 0.5536 | 25.383 | 48.322 |
| 30 | −34.85882 | 1.20000 | 1.882997 | 40.76 | 0.5667 | 25.102 | −43.864 |
| 31 | −336.68517 | 33.00000 | | | | 25.244 | |
| 32 | 79.35416 | 6.19589 | 1.487490 | 70.23 | 0.5300 | 25.746 | 81.814 |
| 33 | −78.66323 | 0.15000 | | | | 25.343 | |
| 34 | −174.28704 | 1.40000 | 1.834000 | 37.16 | 0.5775 | 25.117 | −20.316 |
| 35 | 18.97040 | 7.07764 | 1.516330 | 64.15 | 0.5352 | 24.476 | 30.582 |
| 36 | −84.05581 | 0.86168 | | | | 24.889 | |
| 37 | 38.64148 | 7.67377 | 1.517417 | 52.43 | 0.5564 | 25.766 | 28.911 |
| 38 | −22.91864 | 1.40000 | 1.882997 | 40.76 | 0.5667 | 25.610 | −29.857 |
| 39 | −173.73960 | 0.15000 | | | | 26.790 | |
| 40 | 119.16208 | 6.64543 | 1.517417 | 52.43 | 0.5564 | 27.392 | 43.094 |
| 41 | −27.05740 | 4.70000 | | | | 27.767 | |
| 42 | 0.00000 | 33.00000 | 1.608590 | 46.44 | 0.5664 | 40.000 | |
| 43 | 0.00000 | 13.20000 | 1.516330 | 64.15 | 0.5352 | 40.000 | |
| 44 | 0.00000 | 9.58000 | | | | 40.000 | |
| Image surface | ∞ | | | | | | |

Various data
Zoom ratio 15.00

| | Wide angle | Intermediate | Telephoto |
|---|---|---|---|
| Focal length | 8.00 | 32.00 | 120.00 |
| F number | 1.80 | 1.80 | 2.35 |
| Half angular field of view | 34.51 | 9.75 | 2.62 |
| Image height | 5.50 | 5.50 | 5.50 |
| Total lens length | 259.60 | 259.60 | 259.60 |
| BF | 9.58 | 9.58 | 9.58 |
| d11 | 0.70 | 29.97 | 42.44 |
| d20 | 40.32 | 8.35 | 2.77 |
| d23 | 4.88 | 7.59 | 0.70 |
| Entrance pupil position | 47.48 | 151.46 | 379.01 |
| Exit pupil position | 109.13 | 109.13 | 109.13 |
| Front principal point position | 56.13 | 193.74 | 643.67 |
| Rear principal point position | 1.58 | −22.42 | −110.42 |

Zoom lens unit data

| Unit | Leading surface | Focal length | Lens structure length | Front principal point position | Rear principal point position |
|---|---|---|---|---|---|
| 1 | 1 | 58.00 | 48.59 | 32.53 | 3.63 |
| 2 | 12 | −14.00 | 19.63 | 3.63 | −9.66 |
| 3 | 21 | −30.00 | 3.96 | 0.02 | −2.14 |
| 4 | 24 | 86.75 | 131.94 | 120.79 | −198.70 |

Numerical Embodiment 7

| | | | Unit: mm | | | | |
|---|---|---|---|---|---|---|---|
| | | | Surface data | | | | |
| Surface number | r | d | nd | vd | θgF | Effective diameter | Focal length |
| 1 | 194.96209 | 3.00000 | 1.772499 | 49.60 | 0.5521 | 88.491 | −88.490 |
| 2 | 50.45050 | 23.69287 | | | | 73.351 | |
| 3 | −101.22704 | 2.50000 | 1.772499 | 49.60 | 0.5521 | 72.885 | −111.690 |
| 4 | 610.40944 | 0.19704 | | | | 74.054 | |
| 5 | 112.46576 | 6.06429 | 1.922860 | 18.90 | 0.6495 | 75.732 | 194.404 |
| 6 | 287.65098 | 4.86350 | | | | 75.347 | |
| 7 | −1837.00765 | 7.27013 | 1.651597 | 58.55 | 0.5426 | 75.086 | 230.062 |
| 8 | −139.33725 | 0.20000 | | | | 74.929 | |
| 9 | −472.70380 | 4.65675 | 1.595220 | 67.74 | 0.5442 | 72.970 | 424.413 |
| 10 | −165.62101 | 8.66201 | | | | 72.465 | |
| 11 | −192.35145 | 6.46656 | 1.537150 | 74.81 | 0.5390 | 66.913 | 268.083 |
| 12 | −83.47137 | 0.99766 | | | | 66.556 | |
| 13 | −78.26046 | 2.50000 | 1.800000 | 29.84 | 0.6017 | 66.067 | −270.007 |
| 14 | −123.92169 | 0.20000 | | | | 67.015 | |
| 15 | 144.80685 | 2.00000 | 1.846660 | 23.78 | 0.6034 | 66.705 | −142.303 |
| 16 | 65.69817 | 13.00429 | 1.496999 | 81.54 | 0.5374 | 65.115 | 106.901 |
| 17 | −263.45069 | 0.20000 | | | | 65.049 | |
| 18 | 131.23177 | 9.46925 | 1.496999 | 81.54 | 0.5374 | 64.015 | 146.867 |
| 19 | −161.59164 | 0.20000 | | | | 63.356 | |
| 20 | 61.37933 | 6.25108 | 1.730000 | 49.00 | 0.5575 | 56.603 | 136.191 |
| 21 | 152.31744 | (Variable) | | | | 55.097 | |
| 22* | 123.35380 | 1.20000 | 1.882997 | 40.76 | 0.5667 | 32.089 | −28.857 |
| 23 | 21.12344 | 6.38054 | | | | 26.928 | |
| 24 | −167.62168 | 4.33940 | 1.846660 | 23.78 | 0.6034 | 26.240 | 54.777 |
| 25 | −37.04472 | 0.80000 | 1.772499 | 49.60 | 0.5521 | 25.538 | −98.748 |
| 26 | −72.37210 | (Variable) | | | | 24.901 | |
| 27 | −25.91341 | 0.80000 | 1.834807 | 42.71 | 0.5642 | 24.536 | −28.139 |
| 28 | 270.81861 | 0.16000 | | | | 24.869 | |
| 29 | 87.77809 | 3.31174 | 1.846660 | 23.78 | 0.6034 | 25.043 | 51.048 |
| 30 | −85.31340 | (Variable) | | | | 25.023 | |
| 31 | −31.89775 | 0.90000 | 1.696797 | 55.53 | 0.5433 | 25.027 | −34.635 |
| 32 | 102.09398 | 2.46844 | 1.808095 | 22.76 | 0.6307 | 27.236 | 92.767 |
| 33 | −290.19380 | (Variable) | | | | 27.788 | |
| 34 (Aperture stop) | ∞ | 1.28219 | | | | 32.549 | |
| 35 | ∞ | 5.00427 | 1.816000 | 46.62 | 0.5568 | 33.538 | 57.344 |
| 36 | −47.02989 | 0.20000 | | | | 34.253 | |
| 37 | 121.66426 | 4.00000 | 1.589130 | 61.14 | 0.5406 | 34.746 | 118.312 |
| 38 | −162.68134 | 0.20000 | | | | 34.670 | |
| 39 | 53.21128 | 7.67575 | 1.496999 | 81.54 | 0.5374 | 33.912 | 52.816 |
| 40 | −49.60645 | 1.20000 | 1.846660 | 23.78 | 0.6205 | 33.197 | −43.964 |
| 41 | 156.92657 | 0.19575 | | | | 32.533 | |
| 42 | 24.49279 | 7.89416 | 1.518229 | 58.90 | 0.5456 | 32.141 | 61.163 |
| 43 | 94.58401 | 1.10000 | 1.772499 | 49.60 | 0.5521 | 30.289 | −78.875 |
| 44 | 36.97714 | 21.17659 | | | | 28.740 | |
| 45 | 55.51715 | 6.46969 | 1.805181 | 25.42 | 0.6161 | 22.663 | 21.616 |
| 46 | −24.35459 | 0.90000 | 1.882997 | 40.76 | 0.5667 | 22.365 | −19.627 |
| 47 | 62.39214 | 8.45794 | | | | 22.051 | |
| 48 | 118.59896 | 6.86089 | 1.438750 | 94.93 | 0.5343 | 23.601 | 34.489 |
| 49 | −17.08788 | 1.00000 | 2.003300 | 28.27 | 0.5980 | 23.707 | −26.491 |
| 50 | −48.53765 | 7.21499 | | | | 25.917 | |
| 51 | 55.89004 | 6.66022 | 1.487490 | 70.23 | 0.5300 | 32.106 | 59.353 |
| 52 | −58.04968 | 39.99000 | | | | 32.395 | |
| Image surface | ∞ | | | | | | |

Aspherical surface data

Twenty-second surface

K = 3.15185e+001   A4 = 3.02637e−006   A6 = −5.86837e−009   A8 = −4.69891e−012

Movement locus data

B21 = 40.35954
B31 = 42.94793   B32 = 3.88703   B33 = −8.43442   B34 = 3.38458   B35 = 0.39726
B36 = 0.38969

-continued

| Unit: mm | | | |
|---|---|---|---|
| Various data Zoom ratio 6.50 | | | |
| | Wide angle | Intermediate | Telephoto |
| Focal length | 18.50 | 45.00 | 120.25 |
| F number | 2.80 | 2.80 | 3.43 |
| Half angular field of view | 40.05 | 19.06 | 7.37 |
| Image height | 15.55 | 15.55 | 15.55 |
| Total lens length | 300.07 | 300.07 | 300.07 |
| BF | 39.99 | 39.99 | 39.99 |
| d21 | 0.68 | 25.34 | 41.04 |
| d26 | 2.39 | 4.03 | 4.61 |
| d30 | 39.84 | 10.82 | 3.22 |
| d33 | 6.92 | 9.65 | 0.98 |
| Entrance pupil position | 54.12 | 84.17 | 136.89 |
| Exit pupil position | −165.72 | −165.72 | −165.72 |
| Front principal point position | 70.96 | 119.33 | 186.85 |
| Rear principal point position | 21.49 | −5.01 | −80.26 |

| Zoom lens unit data | | | | | |
|---|---|---|---|---|---|
| Unit | Leading surface | Focal length | Lens structure length | Front principal point position | Rear principal point position |
| 1 | 1 | 46.00 | 102.40 | 59.41 | 25.26 |
| 2 | 22 | −42.00 | 12.72 | −2.77 | −13.83 |
| 3 | 27 | −67.00 | 4.27 | −1.89 | −4.39 |
| 4 | 31 | −56.00 | 3.37 | −0.33 | −2.23 |
| 5 | 34 | 46.94 | 87.49 | 26.91 | −102.68 |

TABLE 1 values corresponding to conditional expressions in Numerical Embodiments 1 to 7

| | | Numerical Embodiment | | | | | | |
|---|---|---|---|---|---|---|---|---|
| | | 1 | 2 | 3 | 4 | 5 | 6 | 7 |
| wide angle end focal length fw | | 18.00 | 15.00 | 20.00 | 19.00 | 14.00 | 8.00 | 18.50 |
| telephoto end focal length | | 180.00 | 75.00 | 160.00 | 95.00 | 56.00 | 120.00 | 120.25 |
| zoom magnification | | 10.00 | 5.00 | 8.00 | 5.00 | 4.00 | 15.00 | 6.50 |
| f1 | | 57.00 | 32.00 | 52.10 | 45.00 | 30.00 | 58.00 | 46.00 |
| f2 | | −26.70 | −18.80 | −21.50 | −24.80 | −19.00 | −14.00 | −42.00 |
| f3 | | −76.10 | −50.00 | −62.00 | −55.00 | 50.00 | −30.00 | −67.00 |
| f4 | | 31.05 | 40.41 | 35.32 | 39.90 | 37.44 | 86.75 | −56.00 |
| f5 | | — | — | — | — | — | — | 46.94 |
| f23 | | — | — | — | — | — | — | −22.82 |
| f11 | | −56.03 | −43.99 | −66.86 | −64.61 | −39.10 | −457.59 | −61.80 |
| f12 | | 143.79 | 170.29 | 133.83 | 200.46 | 124.97 | 60.11 | 150.18 |
| f13 | | 73.69 | 49.34 | 68.81 | 54.51 | 45.59 | — | 60.83 |
| βnw | | −1.96 | −2.36 | −2.01 | −1.62 | −2.22 | −1.40 | −2.04 |
| θp | | 0.5633 | 0.6034 | 0.5633 | 0.6133 | 0.6034 | 0.5633 | 0.6034 |
| θn | | 0.5441 | 0.5863 | 0.5630 | 0.5642 | 0.5667 | 0.5530 | 0.5521 |
| νp | | 44.30 | 23.78 | 44.30 | 25.46 | 23.78 | 44.30 | 23.78 |
| νn | | 63.33 | 34.97 | 48.84 | 42.71 | 40.76 | 49.34 | 49.600 |
| θp23 | | — | — | — | — | — | — | 0.6034 |
| θn23 | | — | — | — | — | — | — | 0.5642 |
| νp23 | | — | — | — | — | — | — | 23.78 |
| νn23 | | — | — | — | — | — | — | 42.71 |
| | Conditional Expression | | | | | | | |
| (1) | $(\theta p - \theta n)/(\nu p - \nu n)$ | −1.01E−03 | 1.53E−03 | −6.61E−05 | −2.85E−03 | −2.16E−03 | −2.04E−03 | −1.99E−03 |
| (2) | nave | 1.75 | 1.80 | 1.78 | 1.91 | 1.83 | 1.84 | 1.83 |

TABLE 1-continued values corresponding to conditional expressions in Numerical Embodiments 1 to 7

| | | Numerical Embodiment | | | | | | |
|---|---|---|---|---|---|---|---|---|
| | | 1 | 2 | 3 | 4 | 5 | 6 | 7 |
| (3) | f2/fw | −1.48 | −1.25 | −1.08 | −1.31 | −1.36 | −1.75 | −2.27 |
| (4) | f1/f2 | −2.13 | −1.70 | −2.42 | −1.81 | −1.58 | −4.14 | −1.10 |
| (8) | (θp23 − θn23)/(νp23 − νn23) | — | — | — | — | — | — | −2.07E−03 |
| (9) | nave23 | — | — | — | — | — | — | 1.84 |
| (10) | f23/fw | — | — | — | — | — | — | −1.23 |
| (11) | f1/f23 | — | — | — | — | — | — | −2.02 |
| (12) | f11/f1 | −0.98 | −1.37 | −1.28 | −1.44 | −1.30 | −7.89 | −1.34 |
| (13) | f13/f11 | −1.32 | −1.12 | −1.03 | −0.84 | −1.17 | — | −0.98 |
| (14) | f1/fw | 3.17 | 2.13 | 2.61 | 2.37 | 2.14 | 7.25 | 2.49 |
| (15) | βnw | −1.96 | −2.36 | −2.01 | −1.62 | −2.22 | −1.40 | −2.04 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-234394, filed Nov. 12, 2013, which is hereby incorporated by reference herein in its entirety.

What is claimed is:

1. A zoom lens, comprising, in order from an object side to an image side:
   a first lens unit having a positive refractive power that does not move for zooming;
   a second lens unit having a negative refractive power that moves during zooming; and
   an N-th lens unit having a positive refractive power that does not move for zooming, the N-th lens unit being arranged closest to the image side,
   wherein the first lens unit comprises in order from the object side to the image side:
      a first sub-lens unit having a negative refractive power that does not move for focusing;
      a second sub-lens unit having a positive refractive power that moves along an optical axis during focusing; and
      a third sub-lens unit having a positive refractive power that does not move for focusing,
   wherein two lenses, among lenses of the second lens unit, disposed closest to the image side of the second lens unit, comprise a positive lens and a negative lens, and
   wherein the following conditional expressions are satisfied:

$-9.0 < f11/f1 < -0.9;$ $-1.5 < f13/f11 < -0.5;$ $-3.0 \times 10^{-3} < (\theta p - \theta n)/(\nu p - \nu n) < 0;$ and $1.7 < nave < 2.0,$ where f1 represents a focal length of the first lens unit, f11 represents a focal length of the first sub-lens unit, f13 represents a focal length of the third sub-lens unit, θp and νp represent a partial dispersion ratio and an Abbe number of the positive lens, respectively, θn and νn represent a partial dispersion ratio and an Abbe number of the negative lens, respectively, and nave represents an average value of refractive indices of all the lenses of the second lens unit, provided that the Abbe number ν and the partial dispersion ratio θ are respectively expressed as follows:

$\nu = (nd - 1)/(nF - nC);$ and $\theta = (ng - nF)/(nF - nC),$ where ng represents a refractive index for a g-line, nF represents a refractive index for an F-line, nd represents a refractive index for a d-line, and nC represents a refractive index for a C-line.

2. The zoom lens according to claim 1, wherein the following conditional expression is satisfied:

$-2.5 < f2/fw < 0,$ where f2 represents a focal length of the second lens unit, and fw represents a focal length at a wide angle end of the zoom lens.

3. The zoom lens according to claim 1, wherein the following conditional expression is satisfied:

$-5.0 < f1/f2 < 0,$ where f1 represents a focal length of the first lens unit.

4. The zoom lens according to claim 1, wherein the second lens unit includes a second positive lens having a refractive index n and an Abbe number ν that satisfy the following conditional expressions:

$1.8 < n < 2.2;$ and $15 < \nu < 30.$

5. The zoom lens according to claim 4, wherein the second positive lens is a positive lens disposed closest to the object side in the second lens unit.

6. The zoom lens according to claim 1, wherein the second lens unit includes a second positive lens having a partial dispersion ratio θi and an Abbe number νi that satisfy the following conditional expression:

$0.648 < \theta i + 2.53 \times 10^{-3} \times \nu i < 0.678.$

7. The zoom lens according to claim 1, wherein the second lens unit comprises three negative lenses and one positive lens.

8. The zoom lens according to claim 1, wherein the following conditional expressions are satisfied:

$1.5 < f1/fw < 9.0;$ and $-2.7 < \beta nw < -1.0,$ where βnw represents a lateral magnification at a wide angle end of the N-th lens unit when an axial ray enters from infinity in a state of focusing on infinity.

9. The zoom lens according to claim 1, wherein the zoom lens comprises the first lens unit, the second lens unit, a third lens unit that moves during zooming, and the N-th lens unit.

10. A zoom lens comprising in order from an object side to an image side:
a first lens unit having a positive refractive power that does not move for zooming;
a second lens unit having a negative refractive power that moves during zooming;
a third lens unit that moves during focusing; and
an N-th lens unit having a positive refractive power that does not move for zooming, the N-th lens unit being arranged closest to the image side,
wherein the first lens unit comprises in order from the object side to the image side:
a first sub-lens unit having a negative refractive power that does not move for focusing;
a second sub-lens unit having a positive refractive power that moves along an optical axis during focusing; and
a third sub-lens unit having a positive refractive power that does not move for focusing,
wherein two lenses, among lenses of the second lens unit and the third lens unit, disposed closest to the image side comprise a positive lens and a negative lens, and
wherein the following conditional expressions are satisfied:

$-9.0 < f11/f1 < -0.9;$ $-1.5 < f13/f11 < -0.5;$ $-3.0 \times 10^{-3} < (\theta p - \theta n)/(\nu p - \nu n) < 0;$ and $1.7 < nave < 2.0,$ where f1 represents a focal length of the first lens unit, f11 represents a focal length of the first sub-lens unit, f13 represents a focal length of the third sub-lens unit, θp and νp represent a partial dispersion ratio and an Abbe number of the positive lens, respectively, θn and νn represent a partial dispersion ratio and an Abbe number of the negative lens, respectively, and nave represents an average value of refractive indices of all the lenses of the second lens unit and the third lens unit,
provided that the Abbe number ν and the partial dispersion ratio θ are respectively expressed as follows:

$\nu = (nd-1)/(nF-nC);$ and $\theta = (ng-nF)/(nF-nC),$ where ng represents a refractive index for a g-line, nF represents a refractive index for an F-line, nd represents a refractive index for a d-line, and nC represents a refractive index for a C-line.

11. The zoom lens according to claim 10, wherein the following conditional expressions are satisfied:

$-2.5 < f23/fw < 0;$ and $-5.0 < f1/f23 < 0,$ where f23 represents a combined focal length at a wide angle end of the second lens unit and the third lens unit.

12. The zoom lens according to claim 10, wherein a group of the second lens unit and the third lens unit includes a second positive lens having and a refractive index n23 and an Abbe number ν23 that satisfy the following conditional expressions:

$1.8 < ni23 < 2.2;$ and $15 < \nu i23 < 30.$

13. The zoom lens according to claim 10, wherein a group of the second lens unit and the third lens unit includes a second positive lens having a partial dispersion ratio θi23 and an Abbe number νi23 that satisfy the following conditional expression, $0.648 < \theta i23 + 2.53 \times 10^{-3} \times \nu i23 < 0.678.$ 14. The zoom lens according to claim 10, wherein the positive lens is a positive lens disposed closest to the object side in the group of the second lens unit and the third lens unit.

15. The zoom lens according to claim 10, wherein the following conditional expressions are satisfied:

$1.5 < f1/fw < 9.0;$ and $-2.7 < \beta nw < -1.0,$ where βnw represents a lateral magnification at a wide angle end of the N-th lens unit when an axial ray enters from infinity in a state of focusing on infinity.

16. The zoom lens according to claim 10, wherein the zoom lens comprises the first lens unit, the second lens unit, the third lens unit, a fourth lens unit that moves during zooming, and the N-th lens unit.

17. An image pickup apparatus, comprising:
a zoom lens, comprising, in order from an object side to an image side:
a first lens unit having a positive refractive power that does not move for zooming;
a second lens unit having a negative refractive power that moves during zooming; and
an N-th lens unit having a positive refractive power that does not move for zooming, the N-th lens unit being arranged closest to the image side,
wherein the first lens unit comprises in order from the object side to the image side:
a first sub-lens unit having a negative refractive power that does not move for focusing;
a second sub-lens unit having a positive refractive power that moves along an optical axis during focusing; and
a third sub-lens unit having a positive refractive power that does not move for focusing,
wherein two lenses, among lenses of the second lens unit, disposed closest to the image side of the second lens unit, comprise a positive lens and a negative lens, and
wherein the following conditional expressions are satisfied:

$-9.0 < f11/f1 < -0.9;$ $-1.5 < f13/f11 < -0.5;$ $-3.0 \times 10^{-3} < (\theta p - \theta n)/(\nu p - \nu n) < 0;$ and $1.7 < nave < 2.0,$ where f1 represents a focal length of the first lens unit, f11 represents a focal length of the first sub-lens unit, f13 represents a focal length of the third sub-lens unit, θp and νp represent a partial dispersion ratio and an Abbe number of the positive lens, respectively, θn and νn represent a partial dispersion ratio and an Abbe number of the negative lens, respectively, and nave represents an average value of refractive indices of all the lenses of the second lens unit, provided that the Abbe number ν and the partial dispersion ratio θ are respectively expressed as follows:

$\nu=(nd-1)/(nF-nC)$; and $\theta=(ng-nF)/(nF-nC)$, where ng represents a refractive index for a g-line, nF represents a refractive index for an F-line, nd represents a refractive index for a d-line, and nC represents a refractive index for a C-line.

18. An image pickup apparatus comprising a zoom lens, the zoom lens comprising in order from an object side to an image side:
   a first lens unit having a positive refractive power that does not move for zooming;
   a second lens unit having a negative refractive power that moves during zooming;
   a third lens unit that moves during focusing; and
   an N-th lens unit having a positive refractive power that does not move for zooming, the N-th lens unit being arranged closest to the image side,
   wherein the first lens unit comprises in order from the object side to the image side:
      a first sub-lens unit having a negative refractive power that does not move for focusing;
      a second sub-lens unit having a positive refractive power that moves along an optical axis during focusing; and
      a third sub-lens unit having a positive refractive power that does not move for focusing,
   wherein two lenses, among lenses of the second lens unit and the third lens unit, disposed closest to the image side comprise a positive lens and a negative lens, and
   wherein the following conditional expressions are satisfied:

$-9.0<f11/f1<-0.9$;

$-1.5<f13/f11<-0.5$;

$-3.0\times10^{-3}<(\theta p-\theta n)/(\nu p-\nu n)<0$; and $1.7<nave<2.0$, where f1 represents a focal length of the first lens unit, f11 represents a focal length of the first sub-lens unit, f13 represents a focal length of the third sub-lens unit, θp and νp represent a partial dispersion ratio and an Abbe number of the positive lens, respectively, θn and νn represent a partial dispersion ratio and an Abbe number of the negative lens, respectively, and nave represents an average value of refractive indices of all the lenses of the second lens unit and the third lens unit, provided that the Abbe number ν and the partial dispersion ratio θ are respectively expressed as follows:

$\nu=(nd-1)/(nF-nC)$; and $\theta=(ng-nF)/(nF-nC)$, where ng represents a refractive index for a g-line, nF represents a refractive index for an F-line, nd represents a refractive index for a d-line, and nC represents a refractive index for a C-line.

* * * * *